US006987238B2

(12) United States Patent
Horner-Richardson et al.

(10) Patent No.: US 6,987,238 B2
(45) Date of Patent: Jan. 17, 2006

(54) PLASMA ARC TORCH AND METHOD FOR IMPROVED LIFE OF PLASMA ARC TORCH CONSUMABLE PARTS

(75) Inventors: Kevin D. Horner-Richardson, Cornish, NH (US); David A. Small, Sharon, VT (US); Jesse A. Roberts, Milton, VT (US)

(73) Assignee: Thermal Dynamics Corporation, West Lebanon, NH (US)

(*) Notice: Subject to any disclaimer, the term of this patent is extended or adjusted under 35 U.S.C. 154(b) by 197 days.

(21) Appl. No.: 09/821,868

(22) Filed: Mar. 30, 2001
(Under 37 CFR 1.47)

(65) Prior Publication Data

US 2003/0034333 A1 Feb. 20, 2003

Related U.S. Application Data

(60) Provisional application No. 60/193,820, filed on Mar. 31, 2000, provisional application No. 60/193,602, filed on Mar. 31, 2000.

(51) Int. Cl.
*B23K 10/00* (2006.01)

(52) U.S. Cl. .......................... 219/121.51; 219/121.49; 219/121.52; 219/121.5; 219/75; 219/121.59; 313/231.31

(58) Field of Classification Search ............ 219/121.5, 219/121.48, 121.39, 121.45, 121.59, 121.51, 219/121.52, 119, 74, 75; 313/231.31, 231.41
See application file for complete search history.

(56) References Cited

U.S. PATENT DOCUMENTS 3,210,586 A 10/1965 Clevett, Jr.
3,450,926 A 6/1969 Kieman
3,858,072 A 12/1974 Dembovsky
4,560,858 A 12/1985 Manning
4,782,210 A 11/1988 Nelson et al.
5,416,296 A 5/1995 Walters
5,440,100 A * 8/1995 Stuart et al. ........... 219/137.31
5,451,739 A 9/1995 Nemchinsky et al.

(Continued)

FOREIGN PATENT DOCUMENTS

EP 62-028084 6/1987

(Continued)

OTHER PUBLICATIONS

International Search Report dated Oct. 25, 2001 in PCT/US 01/10511.

*Primary Examiner*—Mark Paschall
(74) *Attorney, Agent, or Firm*—Harness, Dickey & Pierce, P.L.C.

(57) ABSTRACT

A plasma arc torch and method for improving the life of the consumable parts of the plasma arc torch, including the electrode, the tip and the shield cap. The method includes turbulating gas as it flows over the exposed surfaces of the electrode, tip and shield cap to increase turbulence in the hydrodynamic boundary layer of the gas flow, thereby enhancing convective heat transfer. The result of enhanced cooling is improved consumable parts life. For example, to increase the turbulence of the gas flow over the outer surface of the electrode, the plasma arc torch electrode has a roughened, or textured outer surface formed with dimples, axially extending grooves or spiraling grooves formed in the outer surface of the electrode. The inner and outer surfaces of the tip and the inner surface of the shield cap are similarly textured.

74 Claims, 16 Drawing Sheets

U.S. PATENT DOCUMENTS 5,640,843 A 6/1997 Aston
5,726,415 A * 3/1998 Luo et al. .............. 219/121.48
5,726,420 A 3/1998 Lajoie
5,760,373 A 6/1998 Colling
5,965,040 A * 10/1999 Luo et al. ................ 219/121.5
6,403,915 B1 * 6/2002 Cook et al. ............ 219/121.52

FOREIGN PATENT DOCUMENTS

JP 62-081274 4/1987
JP 62-240170 10/1987

* cited by examiner

FIG. 15

| | Tip Orifice Diameter (in.) | Current (amps) | Std. Volumetric Flow Rate (Std.ft$^3$/hr) | Electrode Outer Diameter (in.) | Tip Inner Diameter (in.) | Gas Passage Cross-Sectional Area (in.$^2$) | Std. Flow Velocity (ft/sec.) | Life (Cycles) |
|---|---|---|---|---|---|---|---|---|
| Textured Electrode with Axial Grooves | 0.055 | 80 | 90 | 0.235 | 0.280 | 0.018202 | 198 | 466 |
| | 0.055 | 80 | 90 | 0.245 | 0.290 | 0.018908 | 190 | 646 |
| | 0.055 | 80 | 90 | 0.235 | 0.285 | 0.02042 | 176 | 429 |
| | 0.055 | 80 | 90 | 0.235 | 0.290 | 0.022678 | 159 | 607 |
| | 0.055 | 80 | 90 | 0.235 | 0.293 | 0.024052 | 150 | 492 |
| | 0.055 | 80 | 90 | 0.245 | 0.303 | 0.024963 | 144 | 463 |
| | 0.055 | 80 | 90 | 0.235 | 0.296 | 0.02544 | 142 | 458 |
| | 0.055 | 80 | 90 | 0.235 | 0.299 | 0.026842 | 134 | 165 |
| | 0.055 | 80 | 90 | 0.235 | 0.303 | 0.028733 | 125 | 153 |
| | 0.031 | 40 | 50 | 0.245 | 0.268 | 0.009267 | 216 | 865 |
| | 0.031 | 40 | 50 | 0.235 | 0.260 | 0.009719 | 206 | 712 |
| | 0.031 | 40 | 50 | 0.235 | 0.263 | 0.010952 | 183 | 734 |
| | 0.031 | 40 | 50 | 0.235 | 0.266 | 0.012198 | 164 | 731 |
| | 0.031 | 40 | 50 | 0.235 | 0.268 | 0.013037 | 153 | 857 |
| | 0.031 | 40 | 50 | 0.245 | 0.290 | 0.018908 | 106 | 724 |
| Textured Electrode w/ Circumferential Grooves | 0.055 | 80 | 90 | 0.233 | 0.280 | 0.018937 | 190 | 144 |
| Non-Textured Electrode | 0.055 | 80 | 90 | 0.233 | 0.280 | 0.018937 | 190 | 141 |
| | 0.055 | 80 | 90 | 0.233 | 0.290 | 0.023414 | 154 | 180 |
| | 0.055 | 80 | 90 | 0.233 | 0.285 | 0.021155 | 170 | 161 |
| | 0.055 | 80 | 90 | 0.233 | 0.296 | 0.026175 | 138 | 191 |

PLASMA ARC TORCH AND METHOD FOR IMPROVED LIFE OF PLASMA ARC TORCH CONSUMABLE PARTS

BACKGROUND OF THE INVENTION

The present invention relates generally to plasma arc torches and, in particular, to consumable parts utilized in plasma arc torches and methods for improving the useful life of such consumable parts.

Plasma arc torches, also known as electric arc torches, are commonly used for cutting and welding metal workpieces by directing a plasma consisting of ionized gas particles toward the workpiece. In a typical plasma torch, a gas to be ionized is supplied to a lower end of the torch and flows past an electrode before exiting through an orifice in the torch tip. The electrode, which is a consumable part, has a relatively negative potential and operates as a cathode. The torch tip (nozzle) surrounds the electrode at the lower end of the torch in spaced relationship with the electrode and constitutes a relatively positive potential anode. The gas to be ionized typically flows through the chamber formed by the gap between the electrode and the tip in a generally swirling or spiraling flow pattern. When a sufficiently high voltage is applied to the electrode, an arc is caused to jump the gap between the electrode and the torch tip, thereby heating the gas and causing it to ionize. The ionized gas in the gap is blown out of the torch and appears as an arc that extends externally off the tip. As the head or lower end of the torch is moved to a position close to the workpiece, the arc jumps or transfers from the torch tip to the workpiece because the impedance of the workpiece to ground is made lower than the impedance of the torch tip to ground. During this "transferred arc" operation, the workpiece itself serves as the anode. A shield cap is typically secured on the torch body over the torch tip and electrode to complete assembly of the torch.

In addition to the electrode, other parts of the plasma arc torch are typically consumed during repeated operation of the torch, including the torch tip and the shield cap surrounding the tip. These consumable parts are consumed as a result of the destructive effects of the high heat environment, and effective management of the heat generated in and on these parts is critical to improving the useful life of the consumable parts. For example, heat is generated in the body of the electrode primarily by interaction with the heated plasma at its front face. Additional heat is generated in the electrode body by ohmic heating resulting from current flow. All of this heat in the electrode must be dissipated by conduction through the electrode body to a cooling mechanism.

To this end, it is known to provide a fluid cooled plasma arc torch in which the electrode is cooled primarily by high velocity plasma gas swirling through a plasma chamber formed by a gap between the electrode and surrounding tip. Plasma gas is directed over the outer surface of the electrode before it is ionized and exits through the tip orifice. A similar condition exists for the torch tip and the shield cap of a plasma arc torch. Heat developed in the tip and the shield cap is dissipated by convection to plasma gas flowing on the inside of the tip and by convection to secondary gas flowing on the outside of the tip. It is well established that cooling of the tip and the electrode during operation of the torch improves the useful life of these components.

Convective heat transfer (i.e., cooling) as discussed herein is the mechanism of heat removal in which heat in a body is deposited into fluid flowing over the surface of the body. The effectiveness of the cooling fluid flowing over the surface is referred to as the convective heat transfer coefficient h, which is impacted by velocity of the fluid flow, turbulence of the fluid flow, physical properties of the fluid, and interactions with surface geometry. In any convective cooling approach, a consequence of the fluid-surface interaction is the development of a region in the fluid adjacent to the surface, through which the fluid flow velocity varies from zero at the surface to a finite value associated with the bulk fluid flow near the center of the flow passage. This region is known as the hydrodynamic boundary layer. As illustrated in FIG. 13, in fully developed turbulent flow this boundary layer consists of three sublayers: a laminar sublayer adjacent the surface, an intermediate buffer layer and a turbulent outer layer. Heat transport across the laminar sublayer is dominated by conduction, while heat transport in the intermediate and turbulent layers is substantially augmented by the convective motion of the eddies present in these layers. The overall effect is that heat transfer from the surface to be cooled is substantially increased by the presence of turbulence in the boundary layer. Effective means for increasing convective heat transfer thus rely on increasing turbulence and mixing in the boundary layer, either by increasing the flow velocity or by promoting mixing or turbulence in the boundary layer as illustrated in FIG. 14.

SUMMARY OF THE INVENTION

Among the several objects and features of the present invention is the provision of a plasma arc torch which enhances convective cooling of the consumable parts of the torch; the provision of such a torch in which the useful life of the consumable parts is increased; and the provision of such a torch in which the electrode is capable of a threadless quick connect/disconnect connection with the cathode of the torch.

Among additional objects and features of the present invention is the provision of a method which increases the useful life of the consumable parts of a plasma arc torch; and the provision of such a method which enhances convective cooling of the consumable parts of the torch.

Other objects and features will be in part apparent and in part pointed out hereinafter.

In general, a plasma are torch of the present invention comprises a cathode and an electrode electrically connected to the cathode. A tip surrounds at least a portion of the electrode in spaced relationship therewith to define a gas passage. The gas passage is in fluid communication with a source of working gas for receiving working gas into the gas passage such that working gas within the gas passage swirls about the outer surface of the electrode. The tip has a central exit orifice in fluid communication with the gas passage. The outer surface of the electrode is textured to promote turbulence of working gas flowing over the outer surface of the electrode as working gas swirls within the gas passage for enhancing convective cooling of the electrode.

In another embodiment, a plasma arc torch of the present invention comprises a cathode and an electrode electrically connected to the cathode. A tip surrounds a portion of the electrode in spaced relationship therewith to define a primary gas passage. The primary gas passage is in fluid communication with a source of primary working gas for receiving primary working gas into the gas passage such that the primary working gas flows over an inner surface of the tip in the gas passage. The tip has a central exit orifice in fluid communication with the gas passage. The inner surface of the tip is textured to promote turbulence of the working gas flowing through the gas passage over the inner surface of the tip for enhancing convective cooling of the tip.

In yet another embodiment, a plasma arc torch of the present invention comprises a cathode and an electrode electrically connected to the cathode. A tip surrounds a portion of the electrode in spaced relationship therewith to define a primary gas passage. The primary gas passage is in fluid communication with a source of primary working gas for receiving primary working gas into the gas passage. The tip has a central exit orifice in fluid communication with the gas passage. A shield cap surrounds the tip in spaced relationship with an outer surface of the tip to define a secondary gas passage for directing gas through the torch over the outer surface of the tip. The shield cap has at least one opening therein for exhausting gas in the secondary gas passage from the torch. The outer surface of the tip is textured to promote turbulence of the gas flowing through the secondary gas passage over the outer surface of the tip for enhancing convective cooling of the tip.

Another plasma arc torch of the present invention generally comprises a cathode and an electrode electrically connected to the cathode. A tip surrounds a portion of the electrode in spaced relationship therewith to define a primary gas passage. The primary gas passage is in fluid communication with a source of primary working gas for receiving primary working gas into the gas passage. The tip has a central exit orifice in fluid communication with the gas passage. A shield cap surrounds the tip in spaced relationship therewith to define a secondary gas passage for directing gas through the torch over an inner surface of the shield cap. The shield cap has at least one opening therein for exhausting gas in the secondary gas passage from the torch. The inner surface of the shield cap is textured to promote turbulence of the gas flowing through the secondary gas passage over the inner surface of the shield cap for enhancing convective cooling of the shield cap.

In general, an electrode of the present invention for use in a plasma arc torch of the type having a cathode, a gas passage defined at least in part by the electrode and a tip surrounding the electrode in spaced relationship therewith and working gas flowing through the gas passage in a generally swirling direction about an outer surface of the electrode generally comprises an upper end adapted for electrical connection to the cathode. A lower end face of the electrode has a recess therein. An insert constructed of an emissive material is disposed in the recess of the lower end face. A longitudinal portion of the electrode intermediate the upper end and the lower end face of the electrode defines at least in part the gas passage through which working gas flows in a generally swirling direction about the electrode. The outer surface of the longitudinal portion of the electrode is textured to promote turbulence of the working gas swirling within the gas passage over the outer surface of the longitudinal portion of the electrode.

A torch tip of the present invention for use in a plasma arc torch of the type having a cathode, a primary gas passage defined at least in part by an electrode electrically connected to the cathode and the tip surrounding the electrode in spaced relationship therewith and working gas flowing through the primary gas passage generally comprises a lower end having a central exit orifice in fluid communication with the primary gas passage for exhausting working gas from the primary gas passage. An inner surface of the torch tip is exposed for fluid contact by working gas in the primary gas passage. The inner surface of the tip is textured to promote turbulence of the gas flowing through the primary gas passage over the inner surface of the tip for enhancing convective cooling of the tip.

In another embodiment, a torch tip of the present invention for use in a plasma torch similar to that above and further having a shield cap surrounding at least a portion of the tip in spaced relationship therewith to define a secondary gas passage through which working gas flows generally comprises a lower end having a central exit orifice in fluid communication with the primary gas passage for exhausting working gas from the primary gas passage. An outer surface of the torch tip is exposed for fluid contact by working gas in the secondary gas passage. The outer surface of the tip is textured to promote turbulence of the gas flowing through the secondary gas passage over the outer surface of the tip for enhancing convective cooling of the tip.

A shield cap of the present invention for use in a plasma arc torch of the type having a cathode, a primary gas passage defined at least in part by an electrode electrically connected to the cathode and a tip surrounding the electrode in spaced relationship therewith and working gas flowing through the primary gas passage, with the shield cap surrounding at least a portion of the tip in spaced relationship therewith to define a secondary gas passage through which working gas flows, generally comprises a lower end having at least one exhaust orifice in fluid communication with the secondary gas passage for exhausting working gas from the secondary gas passage. An inner surface of the shield cap is exposed for fluid contact by working gas in the secondary gas passage. The inner surface of the shield cap is textured to promote turbulence of the gas flowing through the secondary gas passage over the inner surface of the shield cap for enhancing convective cooling of the shield cap.

A series of electrodes of the present invention generally comprises at least two interchangeable electrodes, with each electrode corresponding to a different current level at which the torch is operable. The outer surface of each electrode is textured to promote turbulence of the working gas flowing over the outer surface of the electrode as working gas swirls about the electrode in the gas passage. The cross-sectional area of the textured outer surface of each electrode increases as the current level at which the torch can be operated decreases to thereby decrease the cross-sectional area of the gas passage as the current level decreases.

A series of torch tips of the present invention generally comprises at least two interchangeable tips, with each tip corresponding to a different current level at which the torch is operable. The central exit orifice of the tips substantially decreases as the current level at which the torch can be operated decreases. Each tip has an inner surface defining an inner cross-sectional area of the tip. The inner cross-sectional area of the tips substantially increases as the current level at which the torch can be operated decreases.

In general, a series of electrode and tip sets of the present invention comprises a plurality of electrode and tip sets, with each set corresponding to a different current level at which the torch is operable. Each set comprises an electrode having a textured outer surface to promote turbulence of the working gas flowing over the outer surface of the electrode as the working gas swirls about the electrode, and a tip. The size of the central exit orifice of the tip decreases for each set as the current level at which the torch is operable decreases. The electrode and tip of each set are sized relative to each other such that the cross-sectional area of the gas passage defined therebetween decreases for each set as the current level at which the torch is operable decreases.

A method of the present invention for improving the useful life of an electrode used in a plasma arc torch generally comprises directing working gas through a gas passage defined by an electrode and a tip surrounding the electrode for exhaust from the torch through a central exit orifice of the tip. The working gas swirls within the gas passage about the electrode to flow over an outer surface of the electrode as it is directed through the gas passage to define a hydrodynamic boundary layer generally adjacent the outer surface of the electrode. The boundary layer includes a turbulent outer layer. Gas is turbulated in the hydrodynamic boundary layer generally adjacent the outer surface of the electrode as gas is directed through the gas passage to increase turbulent flow in the boundary layer for enhancing convective cooling of the electrode thereby to improve the useful life of the electrode.

A method of the present invention for improving the useful life of a torch tip generally comprises directing working gas through a secondary gas passage of the torch for exhaust from the torch through at least one opening of the shield cap. The working gas flows over an outer surface of the torch tip as it is directed through the secondary gas passage to define a hydrodynamic boundary layer adjacent the outer surface of the torch tip. The boundary layer includes a turbulent outer layer. Gas is turbulated in the hydrodynamic boundary layer adjacent the outer surface of the torch tip as gas is directed through the secondary gas passage to increase turbulent flow in the boundary layer for enhancing convective cooling of the torch tip thereby to improve the useful life of the torch tip.

A method of the present invention for improving the useful life of a shield cap generally comprises directing working gas through a secondary gas passage of the torch for exhaust from the torch through the least one opening of the shield cap. The working gas flows over an inner surface of the shield cap as it is directed through the secondary gas passage to define a hydrodynamic boundary layer adjacent the inner surface of the shield cap. The boundary layer includes a turbulent outer layer. Gas is turbulated in the hydrodynamic boundary layer adjacent the inner surface of the shield cap as gas is directed through the secondary gas passage to increase turbulent flow in the boundary layer for enhancing convective cooling of the shield cap thereby to improve the useful life of the shield cap.

A method of the present invention for improving the useful life of an electrode or tip of a plasma arc torch generally comprises texturing the surface of at least one of the electrode and tip to promote turbulence of working gas flowing within the gas passage over the textured surface of said at least one of the electrode and tip. The method also includes changing the level of electrical current supplied to the electrode. One or more of the following parameters is modified in response to the change in current: (1) the standard volumetric gas flow rate through said annular gas passage, and (2) the dimensions of the annular gas passage.

BRIEF DESCRIPTION OF THE DRAWINGS

* and FIG. 15 is a table of data from an experiment illustrating the increase in useful lifetime of an electrode consumable of the present invention; and

DETAILED DESCRIPTION OF THE PREFERRED EMBODIMENTS

Figure 1:
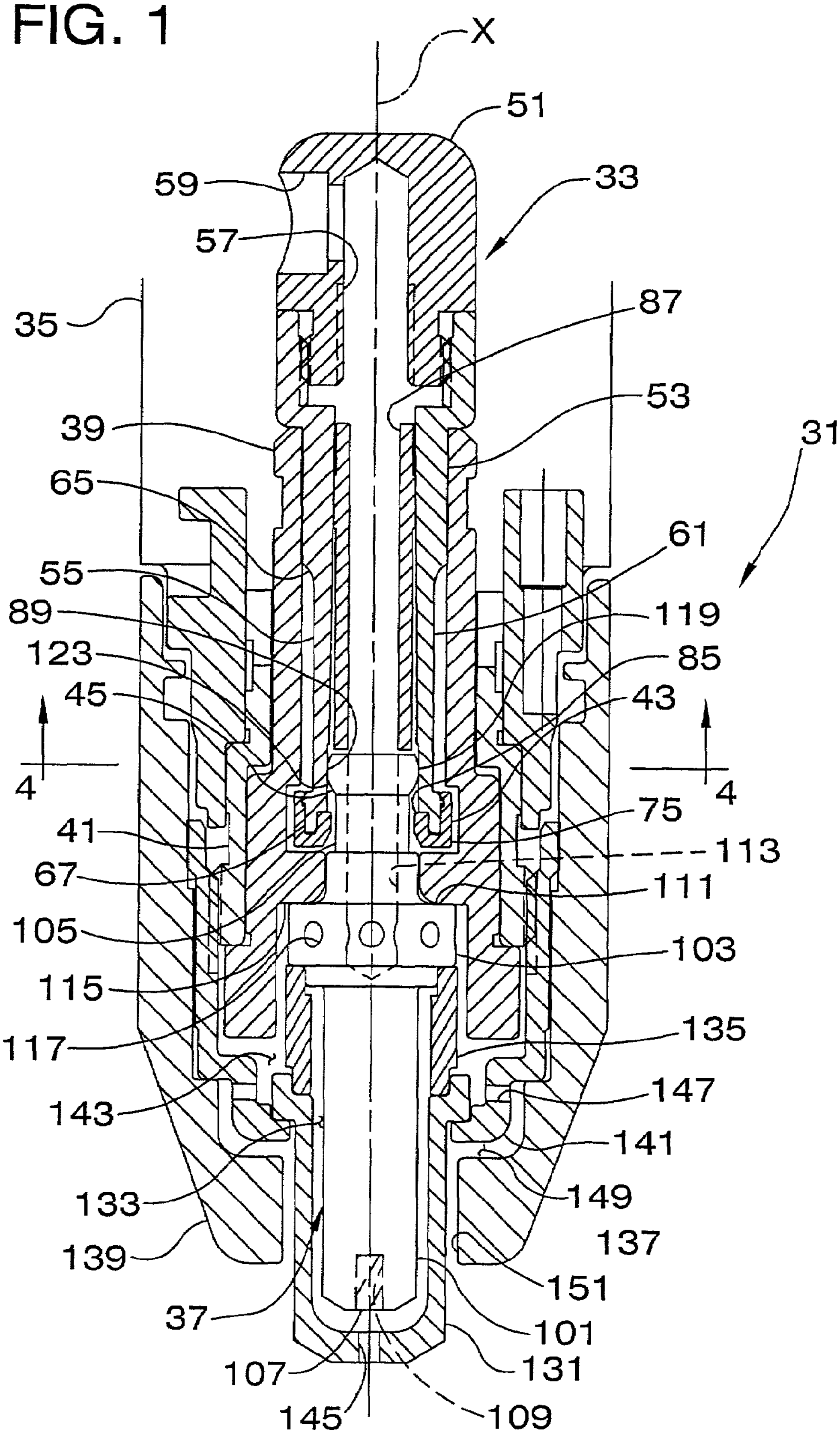
FIG. 1 is a vertical section of a torch head of a plasma torch with an electrode of the torch head shown in full.

With reference to the various drawings, and in particular to FIG. 1, a torch head of a plasma torch of the present invention is generally indicated at 31. The torch head 31 includes a cathode, generally indicated at 33, secured in a torch body 35 of the torch at an upper end of the torch head, and an electrode, generally indicated at 37, electrically connected to the cathode. A central insulator 39 constructed of a suitable electrically insulating material, such as a polyamide or polyimide material, surrounds a substantial portion of both the cathode 33 and the electrode 37 to electrically isolate the cathode and electrode from a generally tubular anode 41 that surrounds a portion of the insulator.

The cathode 33 and electrode 37 are configured for a coaxial telescoping connection (broadly, a threadless quick connect/disconnect connection) with one another on a central longitudinal axis X of the torch. To establish this connection, the cathode 33 and electrode 37 are formed with opposing detents generally designated 43 and 45, respectively. As will be described hereinafter, these detents 43, 45 are interengageable with one another when the electrode 37 is connected to the cathode 33 to inhibit axial movement of the electrode away from the cathode.

The cathode 33 is generally tubular and comprises a head 51, a body 53 and a lower connecting end 55 adapted for coaxial interconnection with the electrode 37 about the longitudinal axis X of the torch. A central bore 57 extends longitudinally substantially the length of the cathode 33 to direct a working gas through the cathode. An opening 59 in the cathode head 51 is in fluid communication with a source of primary working gas (not shown) to receive working gas into the torch head 31. The bottom of the cathode 33 is open to exhaust gas from the cathode. The cathode 33 of the illustrated embodiment is constructed of brass, with the head 51, body 53 and lower connecting end 55 of the cathode preferably being of unitary construction. However, it is understood that the head 51 may be formed separate from the body 53 and subsequently attached to or otherwise fitted on the cathode body without departing from the scope of this invention.

Figure 2:
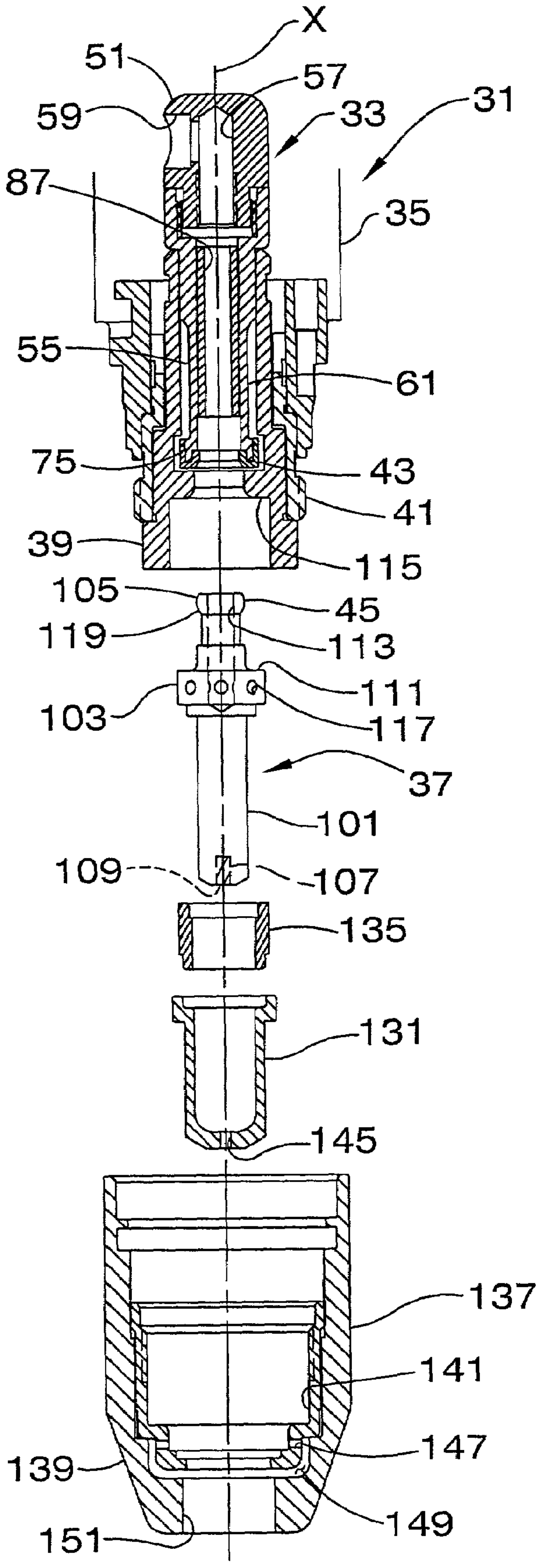
FIG. 2 is an exploded vertical section of the plasma torch head of FIG. 1.
Figure 3:
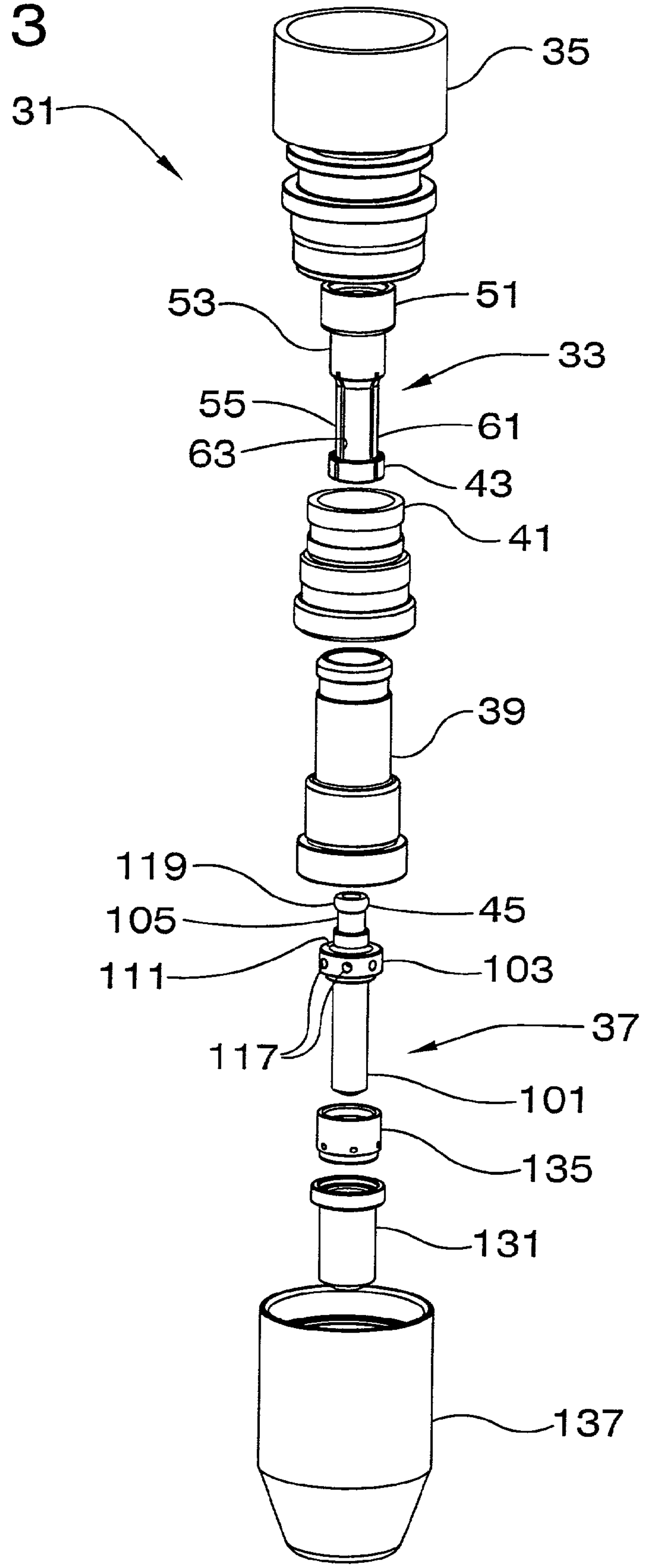
FIG. 3 is an exploded perspective of the plasma torch head of FIG. 1.
Figure 4:
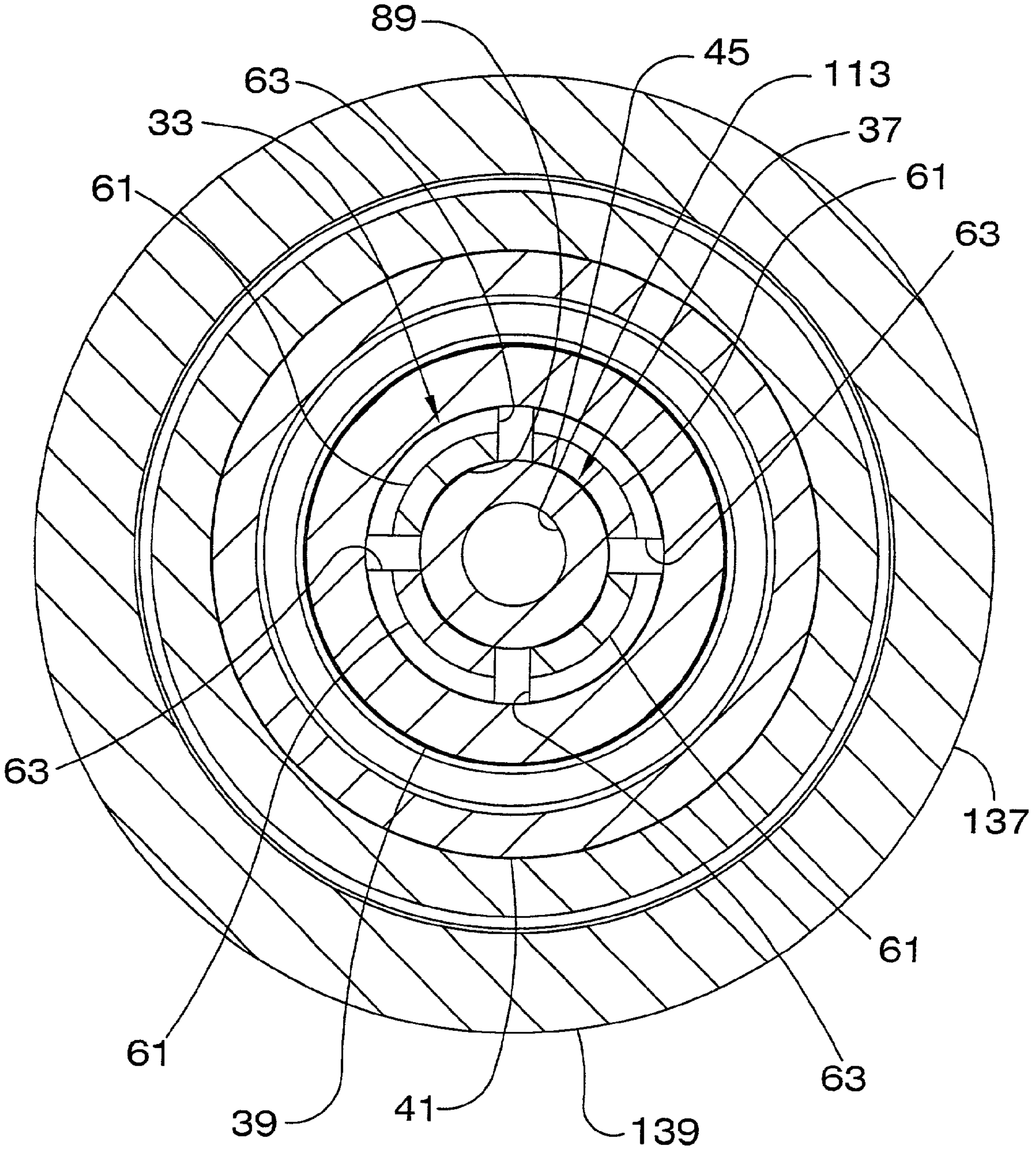
FIG. 4 is a section taken in the plane of line 4—4 of FIG. 1.

Referring to FIGS. 1 and 3, the connecting end 55 of the cathode 33 comprises a set of resilient longitudinally extending prongs 61 defined by vertical slots 63 in the cathode extending up from the bottom of the cathode. The prongs 61 have upper ends 65 integrally connected to the body 53 of the cathode 33 and free lower ends 67 which are offset radially outwardly so that each prong has an upper radial shoulder 69 and a lower radial shoulder 71. The prongs 61 are sufficiently resilient to permit generally radial movement of the prongs between a normal, undeflected state (FIGS. 2 and 5) and a deflected state (FIG. 1) in which the prongs are deflected outward away from each other and the central longitudinal axis X of the torch to increase the inner diameter of the cathode connecting end 55 to enable the electrode 37 to be inserted up into the cathode, as will be described. The radial outward movement of the prongs 61 is permitted by an annular gap 73 formed between the connecting end 61 of the cathode 33 and the central insulator 39.

Figure 5:
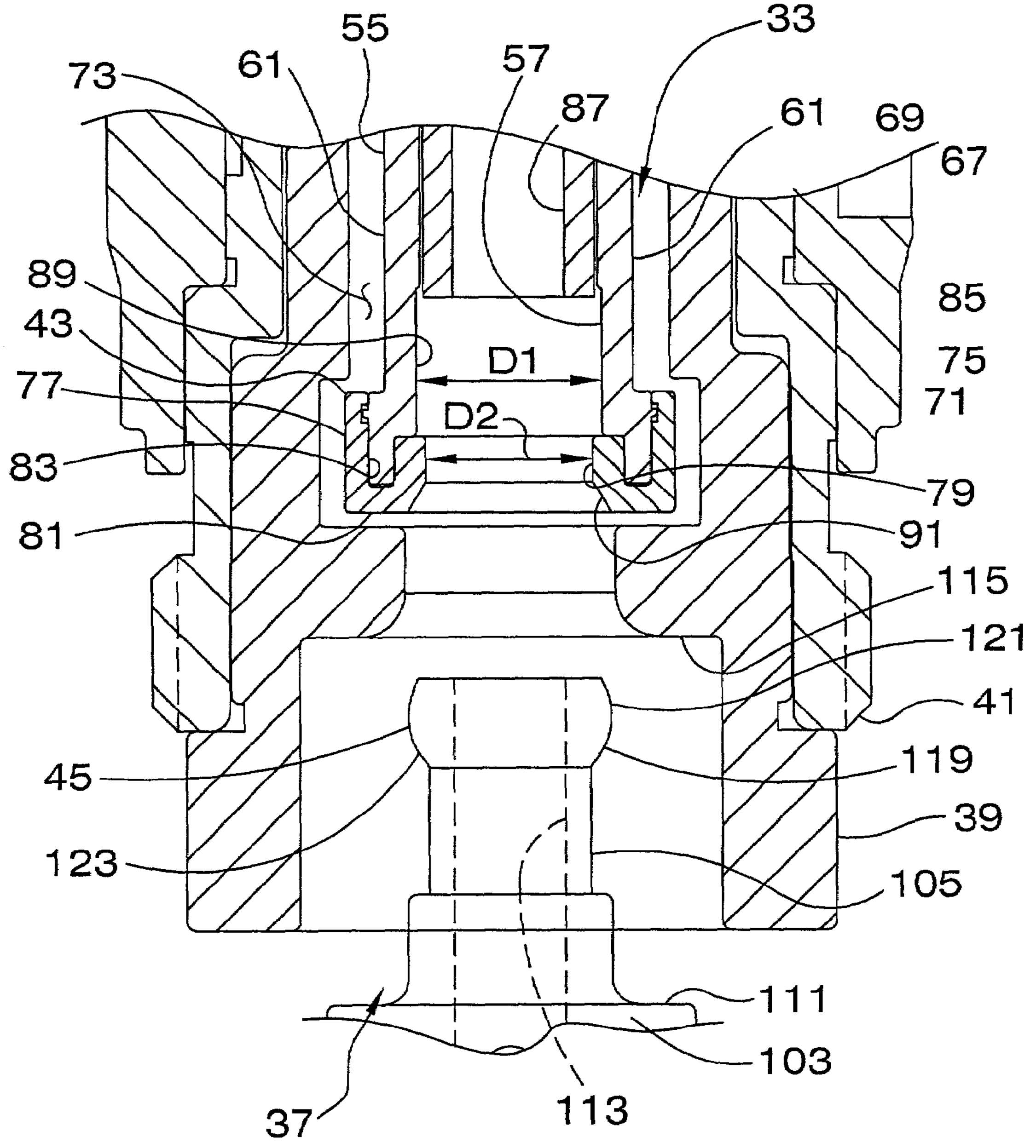
FIG. 5 is an expanded vertical section of a portion of the torch head of FIG. 1 showing respective connecting ends of the electrode and a cathode.

In the preferred embodiment, the detent 43 on the cathode 33 comprises a cap 75 of electrically insulating material fitted on the lower end 67 of each prong 61. Thus, it will be seen that the detent 43 is on the connecting end 61 of the cathode 33 for conjoint radial movement with the prongs between an undeflected and deflected state. As best illustrated in FIG. 5, the cap 75 is generally J-shaped in vertical section, comprising an outer wall 77, an inner wall 79 and a bottom wall 81 which define a recess 83 for receiving the offset lower end 67 of the prong 61. The outer wall 77 of the cap 75 and the lower end 67 the prong 61 have a tongue and groove connection for securely holding the cap on the prong. Significantly, the thickness of the inner wall 79 below the lower radial shoulder 71 of the prong 61 is greater than the width of the lower radial shoulder of the prong so that a portion of the inner wall projects radially inwardly beyond the lower shoulder to define a generally radial detent surface 85 of the cathode detent 43. A sleeve 87 of electrically insulating material is disposed on the inside of the cathode 33 at a location spaced above the radial detent surfaces 85, leaving a portion of the inside wall of the metal cathode exposed to function as an electrical contact surface 89 for the electrode 37. An inner edge 91 of the bottom of the cathode 33 (e.g., of the insulating end caps 75) is tapered outward to provide a cam surface engageable by the electrode 37 upon insertion of the electrode into the cathode to initiate outward displacement of the prongs 61 to their deflected state. The amount of insertion force required to deflect the prongs 61 may vary, but approximately 5 lbs. of axially directed force has been found to be suitable.

The inner diameter D1 (FIG. 5) of the cathode 37 at the contact surface 89 is preferably about 0.208 inches; the inner diameter D2 of the cathode at the insulating end caps 75 is preferably about 0.188 inches; and each radial detent surface 85 preferably projects radially inward from the contact surface approximately 0.01 inches. However, it will be understood that these dimensions may vary. Also, in the preferred embodiment the connecting end 55 of the cathode 33 comprises four resilient prongs 61, but this number may vary from one prong to many prongs without departing from the scope of this invention. Moreover, the radial detent surfaces 85 may be formed in ways other than by the caps 75. For example, the caps 75 may be eliminated entirely, and the detent surfaces 85 may be formed by machined radial grooves or recesses (not shown) in the prongs 61, or by otherwise forming radially inwardly projecting surfaces (not shown) on the prongs.

Referring again to FIGS. 1 and 3, the electrode 37 is generally cylindric and has a solid lower end 101, an upper connecting end 105 adapted for coaxial telescoping connection with the lower connecting end 55 of the cathode 33 about the longitudinal axis X, and a gas distributing collar 103 intermediate the upper and lower ends of the electrode. The electrode 37 of the illustrated embodiment is constructed of copper, with an insert 107 of emissive material (e.g., hafnium) secured in a recess 109 in the bottom of the electrode in a conventional manner. The gas distributing collar 103 extends radially outward relative to the upper and lower ends 105, 101 of the electrode 37, defining a shoulder 111 between the gas distributing collar and the upper connecting end of the electrode. A central bore 113 of the electrode 37 extends longitudinally within the upper connecting end 105 generally from the top of the electrode down into radial alignment with the gas distributing collar 103. It is understood that the collar 103 may be other than gas distributing, such as by being solid, whereby the gas is distributed in another manner, without departing from the scope of this invention.

The central insulator 39 includes an annular seat 115 extending radially inward to define an inner diameter of the central insulator that is substantially less than the outer diameter of the gas distributing collar 103 such that the shoulder 111 formed by the gas distributing collar engages the annular seat 115 to limit insertion of the electrode 37 in the cathode 33 and axially position the electrode in the torch head 31. The top of the electrode 37 is open to provide fluid communication between the cathode central bore 57 and the electrode central bore 113 upon coaxial interconnection of the electrode and cathode 33. Opening 117 extend radially within the gas distributing collar 103 and communicate with the central bore 113 in the electrode connecting end 105 to exhaust working gas from the electrode 37.

With reference to FIG. 5, the outer diameter of the electrode connecting end 105 is predominately of a diameter less than the inner diameter D2 of the connecting end 55 of the cathode 33 at the insulating end caps 75 (e.g., at the cathode detent 43). However, the detent 45 on the electrode 37 comprises an annular protrusion 19 projecting generally radially outward from the connecting end 105 of the electrode such that the outer diameter of the electrode connecting end at the detent is substantially greater than the diameter of the inner surface of the cathode, including the cathode inner diameters D2 at the cathode detent 43 and D1 at the contact surface 89 above the cathode detent. For example, the electrode connecting end 105 of the illustrated embodiment preferably has an outer diameter of about 0.182 inches; and the outer diameter of the electrode connecting end at the electrode detent 45 is preferably about 0.228 inches.

The annular protrusion 119 constituting the electrode detent 45 is preferably rounded to provide an upper cam surface 121 engageable with the tapered inner edge 91 of the bottom of the cathode 33 to facilitate insertion of the electrode connecting end 105 into the cathode connecting end 55. The rounded protrusion 119 also includes a lower radial detent surface 123 engageable with the radial detent surfaces 85 of the cathode detent 43 to inhibit axial movement of the electrode connecting end 105 out of the cathode connecting end 55. It is contemplated that the electrode detent 45 may be other than annular, such as by being segmented, and may be other than rounded, such as by being squared or flanged, and remain within the scope of this invention as long as the detent has a radial detent surface engageable with the radial detent surfaces 85 of the cathode detent 43. It is also contemplated that the detent may be formed separate from the electrode and attached or otherwise connected to the electrode, and may further be resilient, and remain within the scope of this invention. The axial position of the detent 45 on the connecting end 105 of the electrode 37 may also vary and remain within the scope of this invention, as long as the length of the electrode connecting end 105 is sufficient such that when the shoulder 111 of the gas distributing collar 103 engages the annular seat 115 of the central insulator 39, the electrode detent is disposed in the cathode 33 above the cathode detent 43 in electrical engagement with the contact surface 89 of the cathode.

As shown in FIGS. 1–3, a metal tip 131, also commonly referred to as a nozzle, is disposed in the torch head 31 surrounding a lower portion of the electrode 37 in spaced relationship therewith to define a gap forming a gas passage 133 between the tip and the electrode. The gas passage 133 is further defined by a tubular gas distributor 135 extending longitudinally between the tip 131 and the gas distributing collar 103 of the electrode 37 around the lower end of the electrode in radially spaced relationship therewith. The gas distributor 135 regulates the flow of working gas through the gas passage 133. The tip 131, electrode 37 and gas distributor 135 are secured in axially fixed position during operation of the torch by a shield cup 137 comprising an exterior housing 139 of heat insulating material, such as fiberglass, and a metal shield insert 141 secured to the interior surface of the housing. The exterior housing 139 has internal threads (not shown) for threadable engagement with corresponding external threads (not shown) on the torch body 35.

The lower end of the central insulator 39 is radially spaced from the gas distributor 135 and the electrode gas distributing collar 103 to direct gas flowing from the openings 117 in the collar into a chamber 143 defined by the central insulator, gas distributor, tip 131 and shield cup insert 141. The gas distributor 135 has at least one opening (not shown) in fluid communication with both the gas passage 133 and the chamber 143 to allow some of the gas in the chamber to flow into the gas passage and out of the torch through an exit orifice 145 in the tip for use in forming the plasma arc. In the illustrated embodiment, working gas is directed by the gas distributor 135 to flow through the gas passage 133 in a generally swirling or spiral direction about the electrode 37 (e.g., in a generally clockwise direction from the upper end to the lower end of the gas passage) as indicated by the flow arrow in FIG. 1. The remaining gas in the chamber 143 flows through an opening 147 in the shield cap insert 141 into a secondary gas passage 149 formed between the shield cap exterior housing 139 and metal insert for exit from the torch through an exhaust opening 151 in the shield cap. The shield cap 137, tip 131, gas distributor 135 and electrode 37 are commonly referred to as consumable parts of the torch because the useful life of these parts is typically substantially less than that of the torch itself and, as such, require periodic replacement. Operation of the plasma arc torch of the present invention to perform cutting and welding operations is well known and will not be further described in detail herein.

To assemble the plasma torch of the present invention, such as when the consumable electrode 37 requires replacement, the electrode of the present invention is inserted, upper connecting end 105 first, into the torch head 31 up through the central insulator 39. As the electrode connecting end 105 is pushed upward past the annular seat 115 of the central insulator, the cam surface 121 of the detent 45 on the electrode engages the tapered inner edges 91 of the insulating end caps 75 on the lower ends 67 of the prongs 61. The cam surface 121 of the electrode detent 45 urges the cathode prongs 61 outward to move the cathode detent 43 radially outward to its deflected state against the inward bias of the prongs, thereby increasing the inner diameter D2 of the cathode connecting end 55 at the cathode detent to permit further telescoping movement of the electrode connecting end 105 into the cathode to a position in which the radial detent surface 123 of the electrode detent 45 is above the radial detent surfaces 85 of the cathode detent 43.

Once the electrode detent 45 is pushed upward past the cathode detent 43, the electrode detent comes into radial alignment with the contact surface 89 of the cathode connecting end 55 above the detent surfaces 85 where the inner diameter D1 of the cathode connecting end is greater than the inner diameter D2 at the cathode detent. The cathode prongs 61, being in their deflected state, create inward biasing forces that urge the prongs to spring or snap inward to move the cathode detent 43 toward its undeflected state. The metal contact surface 89 of the cathode connecting end 55 is urged against the electrode detent 45 to electrically connect the cathode 33 and electrode 37. Inward movement of the cathode detent 43 generally axially aligns (e.g., in generally overlapping or overhanging relationship) the detent surface 123 of the electrode connecting end 105 with the detent surfaces 85 of the cathode connecting end 55. In other words, the electrode radial detent surface 123 is aligned with the cathode radial detent surfaces 85 so that in the event the electrode 37 begins to slide axially outward from the cathode 33 during assembly or disassembly, the electrode radial detent surface 123 engages the radial detent surfaces 85 to inhibit the electrode from falling out of the torch head 31. Since the outer diameter D2 of the electrode connecting end 105 at the electrode detent 43 is greater than the inner diameter of the cathode connecting end 55 at the contact surface 89, the cathode prongs 61 remain in a deflected state after interconnection of the electrode 37 and cathode 33 to maintain the biasing forces urging the prongs inward against the electrode detent 45 for promoting good electrical contact between the cathode and electrode.

To complete the assembly, the gas distributor 135 is placed on the electrode 37, the tip 131 is placed over the electrode to seat on the gas distributor, and the shield cap 137 is placed over the tip and gas distributor and threadably secured to the torch body 35 to axially fix the consumable components in the torch head 31. Upon securing the shield cap 137 to the torch body 35, the shoulder 111 of the gas distributing collar 103 of the electrode 37 engages the annular seat 115 of the central insulator 39 to properly axially position the electrode in the torch head.

To disassemble the torch, the shield cap 137 is removed from the torch body 35 and the tip 131 and gas distributor 135 are slid out of the torch. The electrode 37 is disconnected from the cathode 37 by pulling axially outward on the lower end 101 of the electrode. The electrode detent surface 123 engages the detent surfaces 85 of the cathode detent 43 and, with sufficient axial pulling force, the electrode detent surface urges the cathode prongs 61 outward to move the cathode detent 43 further toward its deflected state to allow withdrawal of the electrode connecting end 105 from the connecting end 55 of the cathode 33. The rounded detent surface 123 of the annular protrusion 119 facilitates the outward movement of the prongs 61 upon engagement with the detent surfaces 85 of the cathode detent 43.

As illustrated in FIGS. 1–5 and described above, the plasma torch of this first embodiment incorporates an interconnecting cathode 33 and electrode 37 in which the electrode is inserted into the cathode. Alternatively, the electrode 37 may instead be sized and configured for surrounding the cathode 33, with the electrode detent 45 extending radially inward from the electrode connecting end 105 and the cathode detent 43 projecting radially outward from the cathode connecting end 55 such that the cathode prongs 61 are deflected inward upon relative telescoping movement of the cathode and electrode.

FIGS. 6–9 illustrate a second embodiment of a plasma torch of the present invention in which an electrode 237 (as opposed to the cathode 33 of the first embodiment) has a connecting end 305 comprising resilient longitudinally extending prongs 361. As with the first embodiment described above, the torch of this second embodiment includes a cathode, generally indicated at 233, the electrode 237, a central insulator 239, a gas distributor 335, a tip 331 and a shield cap 337. The electrode 237 is configured for coaxial telescoping insertion into the cathode 233 on a longitudinal axis X of the torch for electrical connection with cathode (again referred to broadly as a threadless quick connect/disconnect connection).

In this second embodiment, the central insulator 239 and electrode 237 are formed with radially opposed detents, generally designated 243 and 245, respectively. These detents 243, 245 are interengageable with one another when the electrode 237 is inserted in the torch head 231 to inhibit axial movement of the electrode relative to the central insulator outward from the torch.

Figure 6:
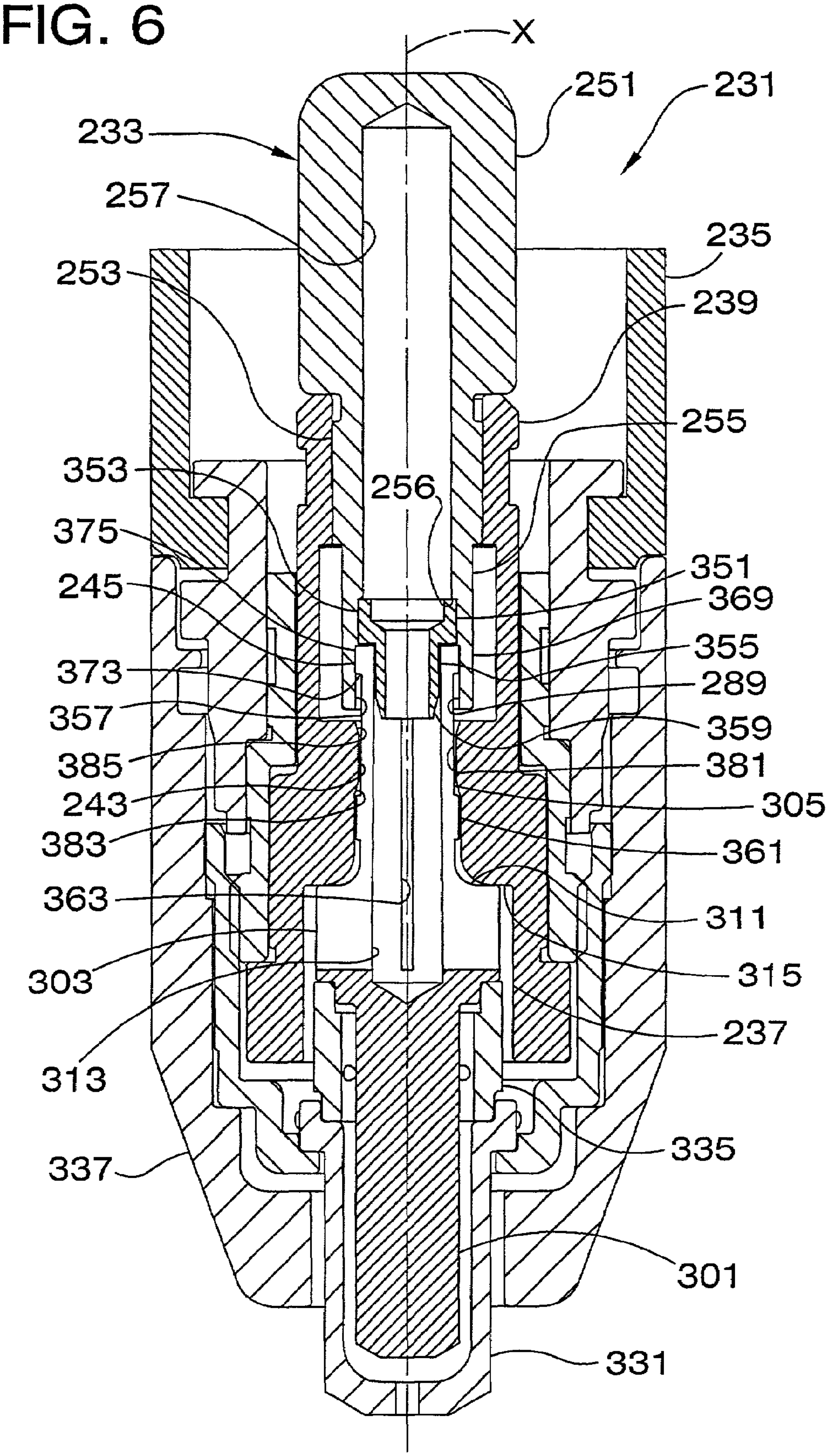
FIG. 6 is a vertical section of a torch head of plasma torch of a second embodiment of the present invention.

As shown in FIG. 6, the cathode 233 is substantially similar to the cathode 33 of the first embodiment, comprising a head 251, a body 253 and a lower connecting end 255. A central bore 257 extends longitudinally substantially the entire length of the cathode 233 to direct a working gas through the cathode. The connecting end 255 of the cathode 233 is generally of rigid construction and is formed of brass, free of the electrically insulating sleeve 87 and end caps 75 described above in connection with the first embodiment. The diameter of the inner surface of the cathode connecting end 255 is jogged outward to define a shoulder 256 (FIG. 9) for seating a plug 351 in the connecting end. The plug 351 is generally cylindric and has a head 353 sized for seating in the connecting end 255 of the cathode 233 up against the shoulder 256 in frictional engagement with the inner surface of the cathode connecting end to secure the plug in the cathode. A body 355 of the plug 351 extends down from the head and has a substantially smaller diameter than the head so that the outer surface of the body is spaced radially inward from the cathode connecting end 255. The inner surface of the connecting end 255 jogs further outward below the shoulder 256 and head 353 of the plug 351 and defines a contact surface 289 of the cathode connecting end for electrical contact with the electrode. The radial spacing between the contact surface 289 and the plug body 351 defines an annular gap or recess 357 sized for receiving the electrode connecting end 305 therein in electrical contact with the contact surface 289 of the cathode connecting end 255. A lower end 359 of the plug body 351 tapers inward to define a cam surface for urging the electrode connecting end 255 to seat in the recess 357 in electrical contact with the contact surface 289.

The electrode 237 of this second embodiment is generally cylindric and has a solid lower end 301, an upper connecting end 305 adapted for coaxial telescoping insertion in the cathode connecting end 255 and interconnection with the central insulator 239 about the longitudinal axis X, and a collar 303 intermediate the upper and lower ends of the electrode. The electrode 237 of the illustrated embodiment is constructed of copper, with an insert (not shown but similar to insert 107 of the first embodiment) of emissive material (e.g., hafnium) secured in a recess (not shown but similar to recess 109 of the first embodiment) in the bottom of the electrode in a conventional manner. The collar 303 extends radially outward relative to the upper and lower ends 305, 301 of the electrode 237, thus defining a shoulder 311 between the collar and the upper connecting end of the electrode. A central bore 313 extends longitudinally within the upper connecting end 305 of the electrode 237 generally from the top of the electrode down into radial alignment with the collar 303 of the electrode. The top of the electrode 237 is open to provide fluid communication between the cathode central bore 257 and the electrode central bore 313 upon insertion of the electrode 237 in the cathode 233.

Figure 7:
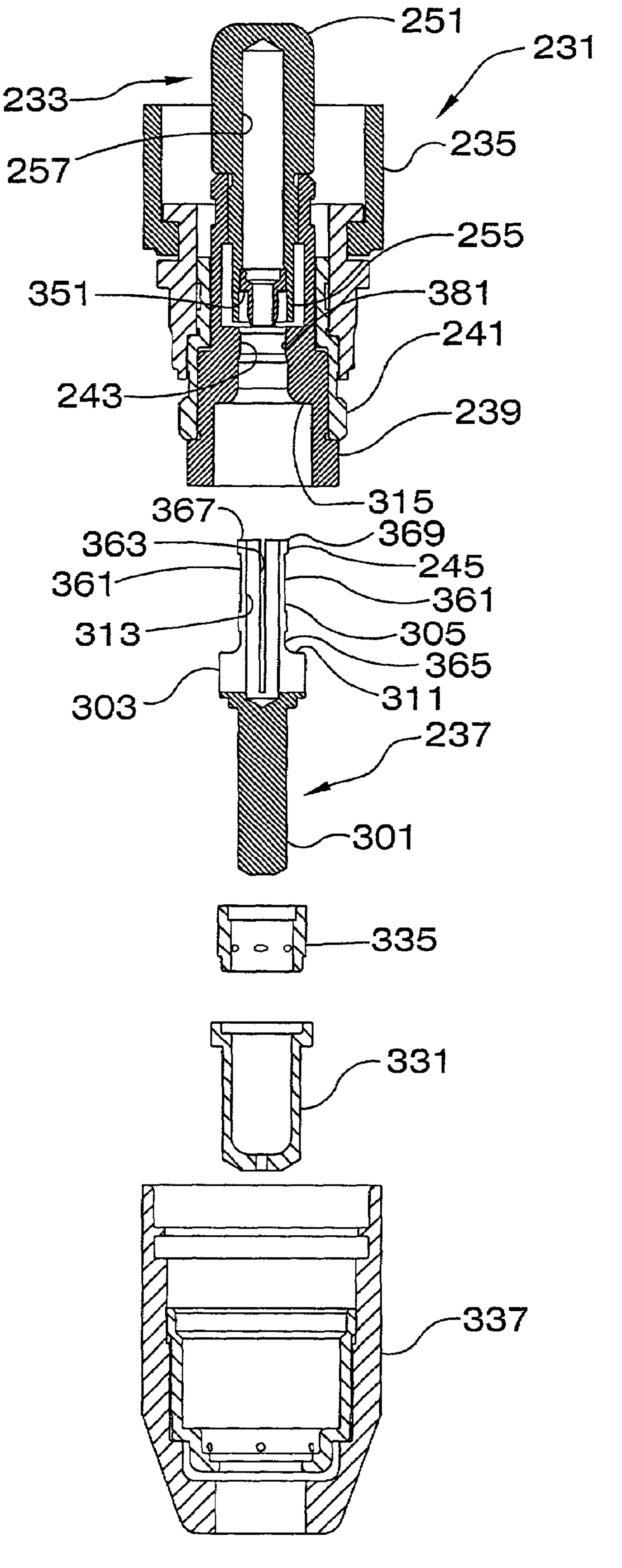
FIG. 7 is an exploded vertical section of the plasma torch head of FIG. 6.
Figure 8:
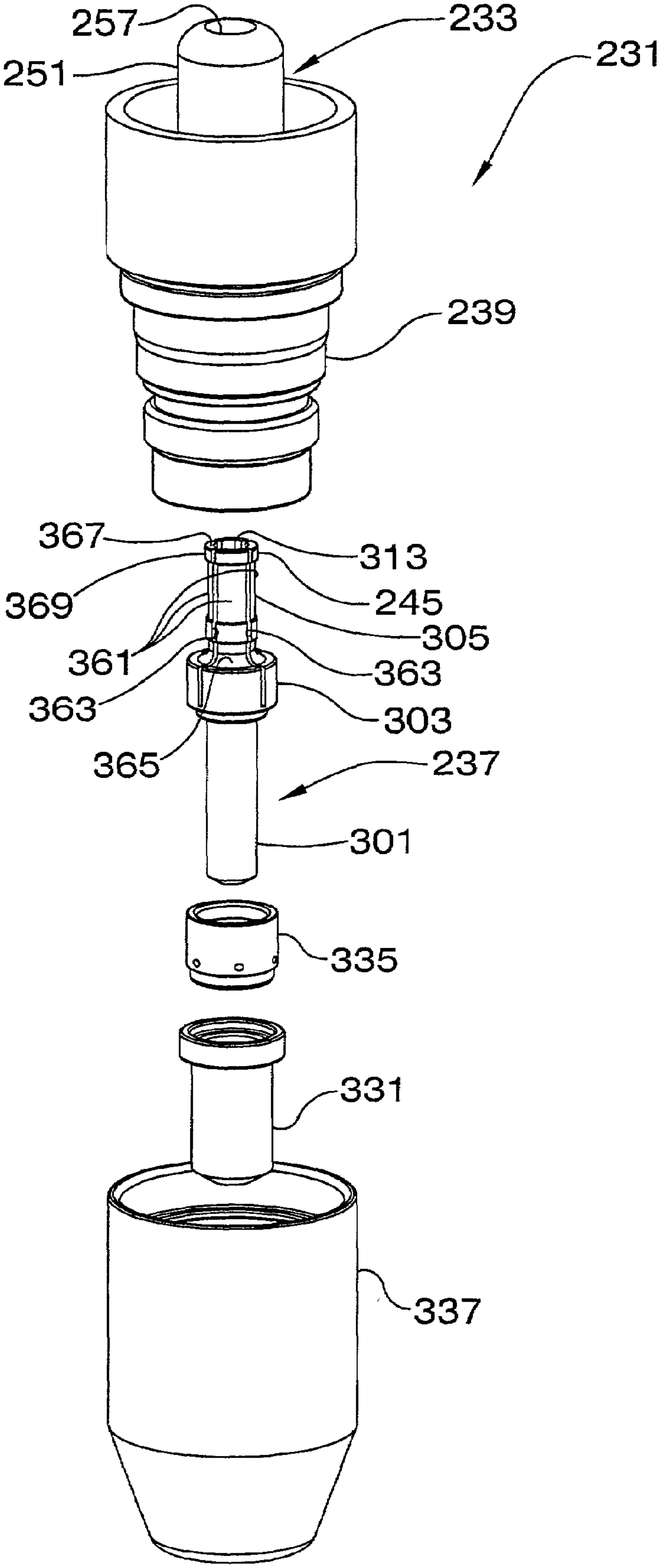
FIG. 8 is an exploded perspective of the plasma torch head of FIG. 6.

Referring to FIGS. 6 and 7, the upper connecting end 305 of the electrode 237 comprises a set of resilient longitudinally extending prongs 361 defined by vertical slots 363 in the electrode connecting end extending generally the length of the central bore 313 of the electrode. These vertical slots 363 also exhaust working gas from the electrode connecting end 305 in a manner substantially similar to the openings 117 of the gas distributing collar 103 of the first embodiment described above. The prongs 361 have lower ends 365, integrally connected to the collar 303 of the electrode 237, and free upper ends 367. The prongs 361 are sufficiently resilient to permit generally radial movement of the prongs between a normal, undeflected state and a deflected state in which the prongs are deflected inward toward each other and the central longitudinal axis X of the torch to decrease the diameter of the electrode connecting end 305 to enable insertion of the electrode connecting end up into the cathode connecting end 255, as will be described.

In the preferred embodiment, the electrode detent 245 comprises a radial projection 369 integrally formed with each prong 361 and extending radially outward from the free upper end 367 of each prong. Thus, it will be seen that the detent 245 is on the connecting end 305 of the electrode 237 for conjoint radial movement with the prongs 361 between an undeflected and deflected state. Each projection 369 is substantially square or rectangular in cross-section (FIG. 9) to define an upper surface 371, a lower radial detent surface 373 and an outer contact surface 375 for electrical contact with the contact surface 289 of the cathode connecting end 255. It is understood, however, that the shape of the detent 245 may vary without departing from the scope of this invention, as long as the detent has a lower radial detent surface 373 extending generally radially outward from the connecting end 305 of the electrode 237 and the electrode is capable of electrical connection with the cathode 239. Also, in the preferred embodiment the connecting end 305 of the electrode 237 comprises four resilient prongs 361, but this number may vary from one prong to many prongs without departing from the scope of this invention.

The central insulator 239 of this second embodiment includes an annular seat 315 extending radially inward to a diameter substantially less than the outer diameter of the electrode collar 303 such that the shoulder 311 formed by the collar engages the annular seat to limit insertion of the electrode 237 in the cathode 233 and axially position the electrode in the torch head 231. The detent 243 on the central insulator 239 is formed by an annular, radially inward extending protrusion 381 located between the bottom of the cathode 239 and the annular seat 315 of the central insulator. As shown in the illustrated embodiment, the detent 243 is preferably positioned adjacent the bottom of the cathode 233. At the lower end of the protrusion 381, the inner diameter of the central insulator tapers inward to define a cam surface 383 for initiating inward deflection of the electrode prongs 361 to their deflected state upon insertion of the electrode through the central insulator 239. The inner diameter of the central insulator 239 tapers back outward at the upper end of the detent 243 to define a radial detent surface 385 of the central insulator in generally radially and axially opposed relationship with the electrode detent surface 373. The tapered detent surface 385 of the central insulator detent 243 also provides a cam surface for deflecting the electrode prongs 361 inward to facilitate withdrawal of the electrode 237 from the cathode 233 upon disassembly of the torch. The detent surface 385 of the central insulator 239 preferably tapers outward to a diameter equal to or slightly less than the inner diameter of the contact surface 289 of the cathode connecting end 255 to guide insertion of the electrode connecting end 305 into the cathode connecting end when installing the electrode 237 in the torch.

Figure 9:
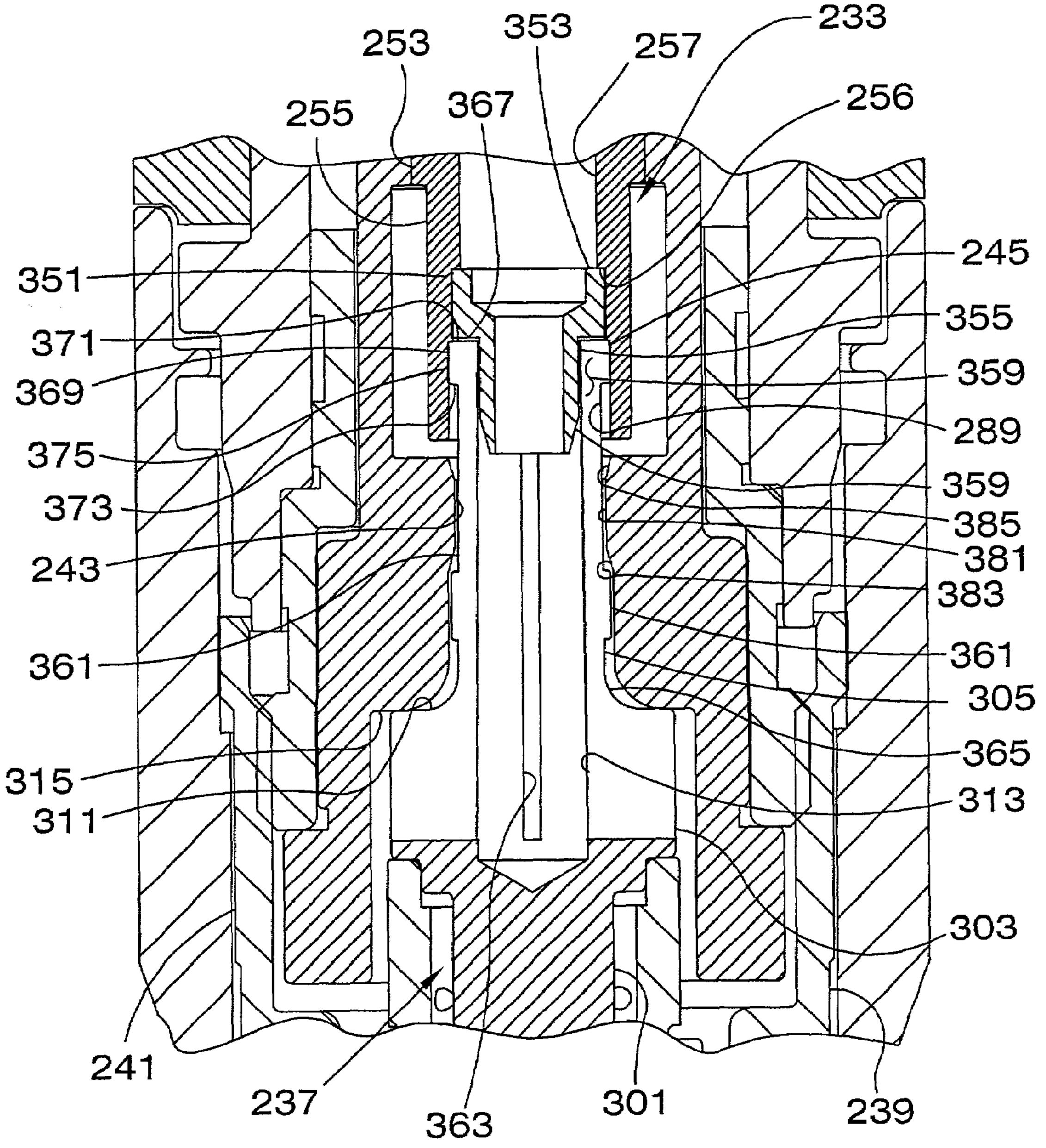
FIG. 9 is an expanded vertical section of a portion of the torch head of FIG. 6 showing respective connecting ends of the electrode and a cathode.

As seen best in FIG. 9, the electrode detent 245 is sized diametrically larger than the inner diameter of the contact surface 289 of the cathode connecting end 255 so that after insertion of the electrode 237 through the central insulator 239 and into the cathode connecting end, the prongs 261 and detent of the electrode will remain in an inward deflected state. The inward deflected prongs 361 create a biasing force that urges the prongs outward, thereby urging the electrode detent 245 to move radially outward into electrical engagement with the contact surface 289 of the cathode connecting end 255 to electrically connect the electrode 237 and cathode 233.

To assemble the plasma torch of the second embodiment, the electrode 237 is inserted, upper connecting end 305 first, into the torch head up through the central insulator 239. As the electrode connecting end 305 is pushed past the annular seat 315 of the central insulator 239, the upper surfaces 371 of the radial projections 369 on the prongs 361 of the electrode 237 engage the tapered lower cam surface 383 of the central insulator detent 243. The cam surface 383 urges the electrode prongs 361 inward against the outward bias of the prongs to radially move the electrode detent 245 inward to its deflected position, thereby decreasing the outer diameter of the electrode connecting end 305 at the electrode detent to permit further insertion of the electrode connecting end through the central insulator 239 and into the cathode connecting end 255 to a position in which the radial detent surfaces 373 of the electrode detent 245 are above the radial detent surface 385 of the central insulator detent 243.

Once the electrode detent 245 is pushed upward past the central insulator detent 243 and into the cathode connecting end 255, the electrode detent 243 comes into radial alignment with the contact surface 289 of the cathode connecting end 55 where the inner diameter of the cathode connecting end is greater than the inner diameter at the central insulator detent. The electrode prongs 361, being in their deflected state, create outward biasing forces that urge the prongs outward to move the electrode detent 243 toward its undeflected state. The outer contact surfaces 375 of the radial prong projections 369 are urged outward against the contact surface 289 of the cathode connecting end 289 to electrically connect the cathode 233 and electrode 237. Outward movement of the electrode detent 243 generally axially aligns (e.g., in overlapping or overhanging relationship) the detent surfaces 373 of the electrode connecting end 305 with the detent surface 385 of the central insulator 289. In other words, the electrode radial detent surfaces 373 are aligned with the central insulator detent surface 385 so that in the event the electrode 237 begins to slide axially outward from the torch head 231 during assembly or disassembly, the electrode radial detent surfaces 373 engage the radial detent surface 385 of the central insulator 239 to inhibit the electrode from falling out of the torch head 31.

Since the outer diameter of the electrode connecting end 305 at the detent 243 is greater than the inner diameter of the cathode connecting end 255 at the contact surface 289, the electrode prongs 361 remain in an inward deflected state after insertion of the electrode 237 in the cathode 233 to maintain the biasing forces urging the electrode detent 245 outward against the cathode contact surface for promoting good electrical contact between the cathode 233 and electrode. Where slight permanent inward deformation of an electrode prong 361 is present, the outward bias of the prong may not be sufficient to urge the electrode detent 245 into electrical contact with the cathode contact surface 289. In that case, the upper surface 371 of the radial projection 369 on the deformed prong 361 will engage the tapered lower end 359 of the plug body 355 upon insertion of the electrode connecting end 305 into the cathode connecting end 255. The tapered lower end 359 provides a cam surface that urges the electrode prong 361 outward, thereby moving the electrode detent radially outward to seat in the recess 357 between the plug body 355 and the contact surface 289 with the prong projections 369 in electrical engagement with the contact surface.

To complete the assembly, the gas distributor 235 is placed on the electrode 237, the tip 231 is placed over the electrode to seat on the gas distributor, and the shield cap 237 is placed over the tip and gas distributor and threadably secured to the torch body 235 to axially fix the consumable components in the torch head 231. Upon securing the shield cap 237 to the torch body 235, the shoulder 311 of the collar 303 of the electrode 237 engages the annular seat 315 of the central insulator 239 to properly axially position the electrode in the torch head.

To disassemble the torch, the shield cap 237 is removed from the torch body 235 and the tip 231 and gas distributor 235 are slid out of the torch. The electrode 237 is removed from the torch by pulling axially outward on the lower end 301 of the electrode. The electrode detent surfaces 373 engage the tapered detent surface 385 of the central insulator detent 243 and, with sufficient axial pulling force, the tapered detent surface urges the electrode prongs 361 further inward to move the electrode detent 245 further toward its deflected state to allow withdrawal of the electrode connecting end 305 from the central insulator 239.

As illustrated in this second embodiment, the plasma torch of the present invention incorporates an electrode 237 and central insulator 239 having interengageable detents 245, 243 for inhibiting axial movement of the electrode outward from the torch during assembly of the torch. However, it is understood that instead of the detent 243 extending radially from the central insulator 239, the detent may instead extend radially from the inner surface of the cathode connecting end 255 in a manner similar to that described above with respect to the first embodiment, without departing from the scope of this invention. Also, the electrode 237 may instead be sized and configured for surrounding the cathode 233, with the electrode detent 245 extending radially inward from the electrode connecting end 305 and a corresponding detent extending radially outward from the cathode connecting end 255 such that the electrode prongs 361 are deflected outward upon relative telescoping movement of the cathode and electrode.

Figure 10A:
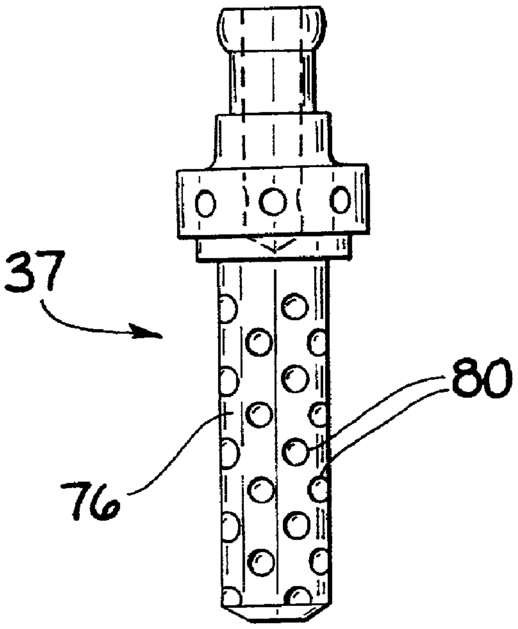
FIGS. 10*a–c* are elevations of various embodiments of the electrode of the plasma arc torch of FIG. 1, with the outer surface of the electrode textured in accordance with the present invention.
Figure 10B:
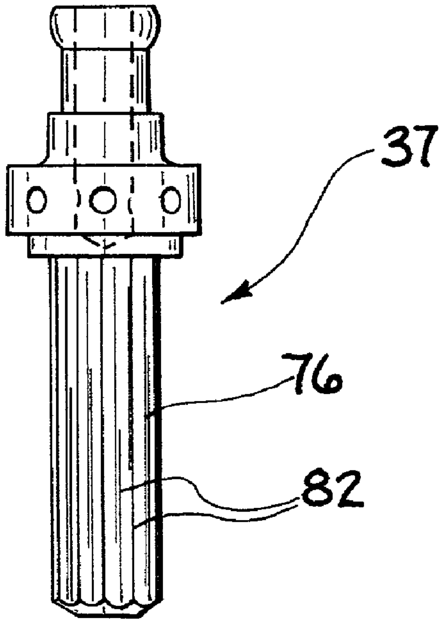
Figure 10C:
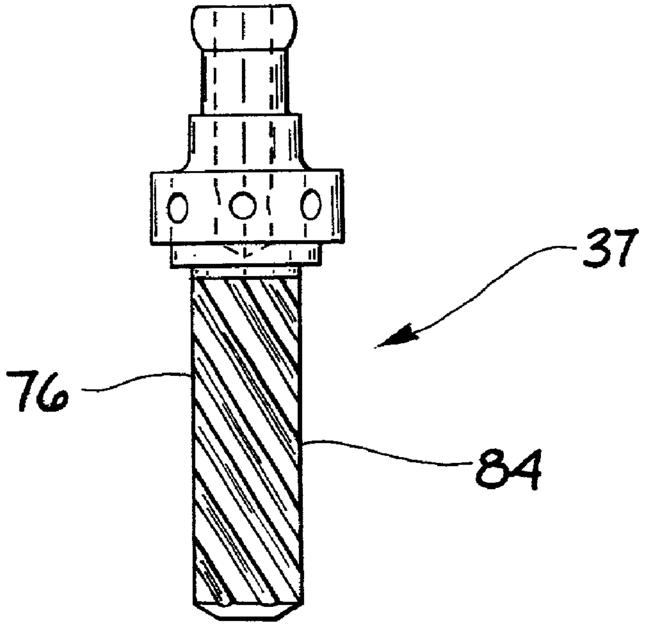

Now referring to FIGS. 10*a–c,* in accordance with the present invention the electrode 37 of the plasma arc torch of the first embodiment (FIGS. 1–5) has a roughened, or textured outer surface 76 along substantially the entire length of the portion of the electrode that partially defines (along with the torch tip) the gas passage 133. The textured outer surface 76 of the electrode 37 may be formed by circular depressions or dimples (indicated as 80 in FIG. 10*a*), similar to those formed in the outer cover of a golf ball, or by axially extending grooves (indicated as 82 in FIG. 10*b*) or by one or more spiral, thread-like grooves (indicated as 84 in FIG. 10*c*) in the outer surface of the electrode. The axially extending grooves 82 of the electrode 37 of FIG. 10*b* and the spiral grooves 84 of the electrode 37 of FIG. 10*c* are sized and oriented for turbulating working gas swirling about the outer surface of the electrode in the gas passage 133. As an example, the electrode 37 of FIG. 10*b* has a textured outer surface 76 formed by about 12–14 axially extending grooves 82 spaced equally about the outer surface of the electrode, with each groove having a depth of approximately 0.015 inches. It has been found that forming the textured surface by providing a smaller number of deeper grooves 82 is generally preferred over a textured surface formed by providing a greater number of shallower grooves since the deeper grooves are more capable of turbulating working gas flowing over the outer surface of the electrode.

The spiral grooves 84 of the textured surface 76 of the electrode 37 of FIG. 10*c* also have a depth of about 0.015 inches. The spiral grooves 84 extend downward within the outer surface of the electrode 37 in a direction crosswise, or counter, to the direction that working gas swirls about the electrode within the gas passage 133. The pitch of each spiral groove 84 is preferably equal to or less than the pitch of the swirling gas within the gas passage 133 so that the longitudinal component of each groove is at least as great as, or preferably greater than, the longitudinal component of the swirling gas in the gas passage.

The grooves 82, 84 of the electrode 37 of FIGS. 10*b,* 10*c* may be formed by various methods, such as by knurling, molding or machining the grooves in the outer surface of the electrode. For example, the axially extending grooves 82 of the textured surface 76 of the electrode 37 of the embodiment of FIG. 10*b* are preferably formed by knurling the outer surface of the electrode. It is understood that the textured outer surface 76 may be formed other than as illustrated in FIGS. 10*a–c* without departing from the scope of this invention. Also, while the textured electrode 37 of the present invention is shown and described herein as being used in connection with the plasma arc torch of the first embodiment (FIGS. 1–5), it is understood that the textured electrode may be used in other plasma arc torches in which gas is directed through a gas passage 133 in a generally swirling direction, without departing from the scope of this invention.

Figure 13:
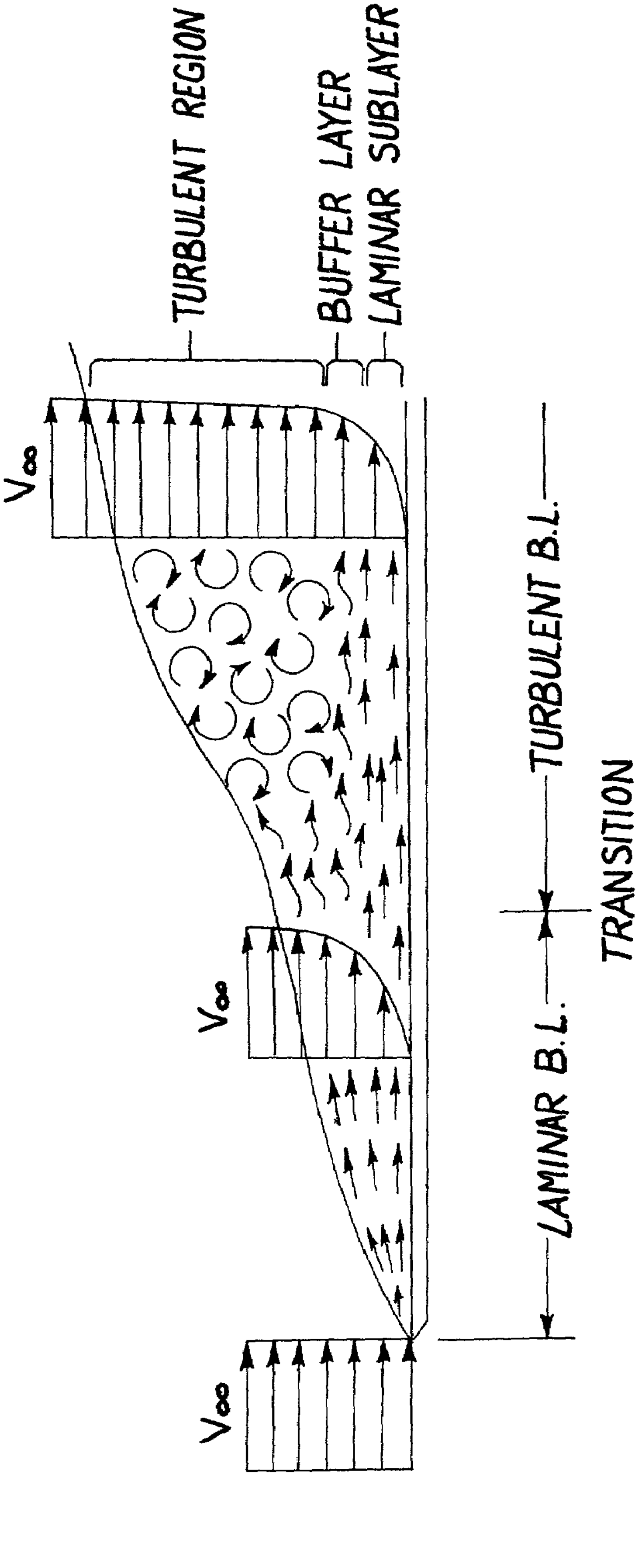
FIG. 13 is a schematic illustration of a conventional hydrodynamic boundary layer comprising a laminar sub-layer, intermediate buffer layer and outer turbulent layer.
Figure 14:
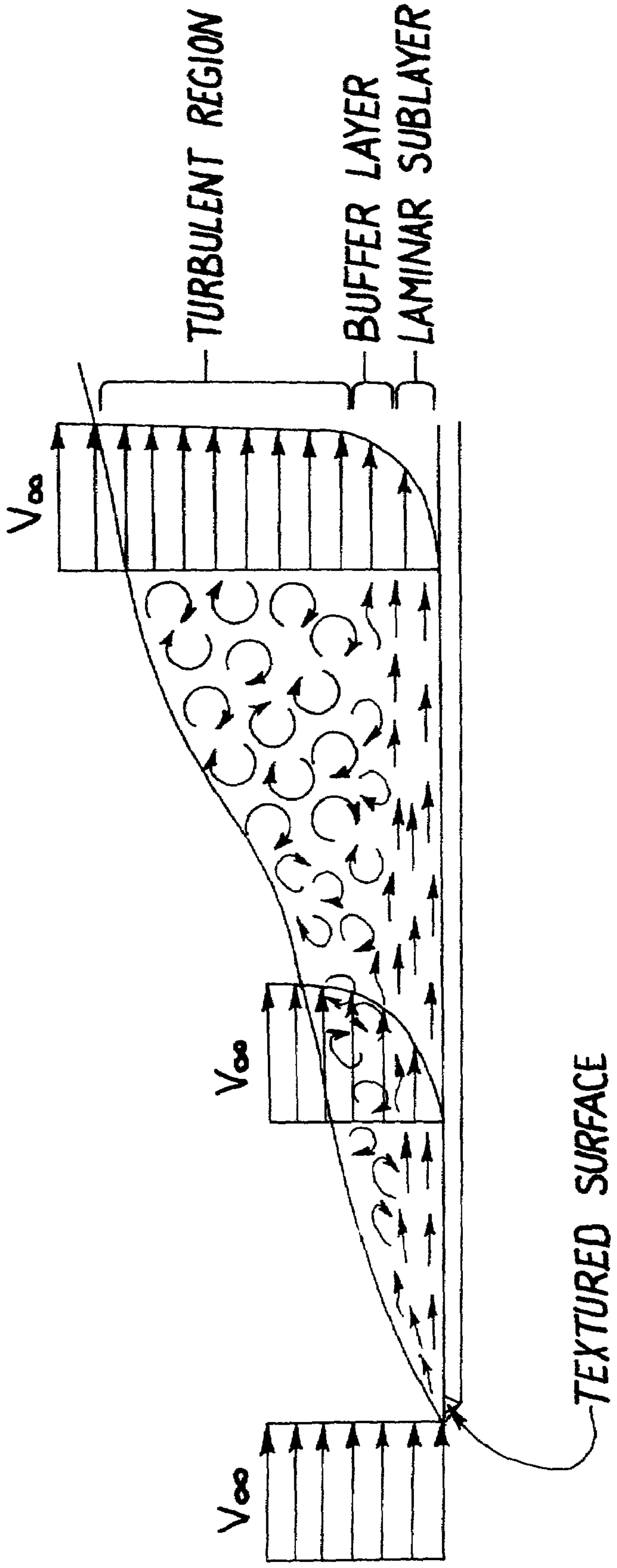
FIG. 14 is a schematic illustration of a hydrodynamic boundary layer for flow over a textured surface such as the electrode of FIGS. 10*a–c.

In accordance with a method of the present invention for improving the useful life of consumable parts of a plasma arc torch, primary working gas is directed to flow downward through the gas passage 133 in a swirling motion about the electrode 37, flowing over the textured outer surface 76 of the electrode. As with any fluid flow in an annular passageway, a hydrodynamic boundary layer (FIG. 13) is established on the outer surface 76 of the electrode 37. As the gas flows over the textured outer surface 76 of the electrode 37, the gas is tumbled or turbulated in the boundary layer (FIG. 14) to increase turbulence in the boundary layer near the outer surface of the electrode, thereby improving the cooling effectiveness of the gas. Providing the textured outer surface 76 of the electrode 37 to promote turbulence of the gas swirling within the gas passage has been found to substantially increase the useful life of an electrode. In particular, it has been found that for a torch in which the working gas flows through the gas passage 133 in a swirling direction (e.g., clockwise from the upper end to the lower end of the gas passage as illustrated in FIG. 1), the textured outer surface 76 of the electrode 37 is preferably formed to extend within the outer surface of the electrode in a direction other than the direction that working gas swirls about the electrode within the gas passage 133. For example, the axially extending grooves 82 of the electrode 37 of FIG. 10*b* are oriented generally crosswise to the direction of swirling gas in the gas passage 133. As another example, the spiral grooves 84 of the electrode 37 of FIG. 10*c* spiral within the outer surface of the electrode in the direction crosswise, or counter (e.g., in a counter-clockwise direction) to the direction of swirling gas within the gas passage 133.

It has also been found that under the conditions that exist inside the gas passage 133, convective cooling of the textured electrode 37 and the tip 131 generally increases with the flow velocity through the annular gas passage between the outer diameter of the electrode and the inner diameter of the tip. The gas flow velocity is generally directly proportional to the volumetric flow rate of the gas through the torch and generally inversely proportional to the dimensions that define the annular space forming the gas passage 133 between the tip 131 and the electrode 37. Thus, to further enhance consumable life (i.e., the useful or working lives of the electrode 37 and tip 131), the beneficial affect derived from the textured surface 76 may be augmented by increasing volumetric flow rates and/or by decreasing the cross-sectional area of the gas passage 133 defined by the electrode and tip. Increasing the volumetric flow rate and/or decreasing the cross-sectional area of the annular gas passage 133 will tend to increase the flow velocity of the gas flowing through the gas passage. The cross-sectional area of the gas passage 133 may be decreased by increasing the outside diameter of the electrode (e.g., by increasing the cross-sectional area of the outer surface of the electrode) and/or by decreasing the inside diameter of the tip (e.g., by decreasing the cross-sectional area of the inner surface of the tip) to narrow the gap between the two parts.

By way of example, the volumetric flow rate for the torch of the present invention is preferably reduced, along with the diameter of the exit orifice 145 of the tip 131, as the current level at which the torch is operated is reduced. Absent a corresponding decrease in the cross-sectional area of the gas passage 133, the gas flow velocity in the gas passage would be substantially reduced at lower volumetric flow rates, resulting in decreased cooling of the consumable parts. This decrease in cooling can be avoided by using the textured electrode 37 in combination with a higher volumetric flow rate or, more preferably, a reduced size of the cross-sectional area of the gas passage 133 defined by the electrode and tip 131 to provide higher flow velocity in the gas passage for greater cooling, or a combination of both. However, it has been found that where a non-textured electrode is used, increasing the flow velocity of the gas swirling within the gas passage 133 by decreasing the cross-sectional area of the gas passage provides little or no improvement in the useful life of the non-textured electrode, and may even decrease its useful life.

EXPERIMENT

An experiment was conducted in which a series of tests were performed using the plasma arc torch shown in FIGS. 1–5 and described above. For each test, the torch was fitted with an electrode 37 and a tip 131 and operated at a predetermined current level, such as 80 amps or 40 amps, and a predetermined standard volumetric flow rate corresponding to the current level at which the torch was operated, such as 90 standard cubic ft./hr. and 50 standard cubic ft./hr., respectively. As used herein, the standard volumetric flow rate is measured using a conventional gas turbine meter positioned at the exit of the tip 131 at atmospheric pressure and room temperature. In accordance with conventional plasma arc torch design, the central exit orifice 145 of the tip 131 used for operating the torch at 80 amps (e.g., about 0.055 inches) was greater than the central exit orifice of the tip used for operating the torch at 40 amps (e.g., about 0.031 inches).

For each test, the outer diameter (e.g., outer surface) of the electrode 37 and the inner diameter (e.g., inner surface) of the tip 131 were sized relative to each other to obtain a different cross-sectional area of the gas passage 133 formed between the electrode and the tip. In effect, varying the cross-sectional area of the gas passage 133 resulted in variance of a standard flow velocity of working gas swirling within the gas passage 133 about the outer surface of the electrode 37. As used herein, the standard flow velocity is a calculated velocity obtained by dividing the standard volumetric flow rate by the cross-sectional area of the gas passage. The cross-sectional area of the gas passage 133 as used herein is calculated based on the outermost diameter of the electrode 37 and does not reflect any additional spacing between the electrode and the tip 131 resulting from the grooves 82 formed in the outer surface of the electrode.

One set of tests was run at a current level of 80 amps using electrodes 37 having axially extending grooves 82 in their outer surface, with each groove having a depth of about 0.015 inches. A similar set of tests was run at a current level of 40 amps. For further comparison purposes, a third set of tests was run at a current level of 80 amps using non-textured electrodes and a fourth test was run at a current level of 80 amps using an electrode (not shown) having grooves (not shown) extending substantially circumferentially within its outer surface (e.g., by forming a threaded outer surface having a high pitch, such as about 20 threads/inch to approximate circumferentially oriented grooves).

Each test comprised repeated operation of the torch through a working cycle including starting the torch, piercing a metal workpiece, cutting the workpiece and shutting off the gas flow through the torch. The duration of each working cycle was 11 seconds. Operation of the torch was repeated until a catastrophic failure of the electrode resulted in the torch becoming inoperable without replacement of the electrode. The number of working cycles completed before failure of the electrode was recorded as the useful lifetime of the electrode. The useful lifetime data reported in the table of FIG. 15 is based on conducting each test three times and averaging the resultant useful lifetime data.

According to the results of the experiment, the useful lifetime of the textured electrode 37 incorporated in the torch operated at a current level of 80 amps generally increased with the increased standard flow velocity resulting from decreasing the cross-sectional area of the gas passage 133 between the electrode and the tip 131 while holding constant the current level and the standard volumetric flow rate. While not as pronounced, the useful lifetime of the textured electrode 37 incorporated in the torch operated at 40 amps also generally increased with the increased standard flow velocity resulting from decreasing the cross-sectional area of the gas passage 133 while holding constant the current level and the standard volumetric flow rate.

However, the test results also suggest that when a non-textured electrode is used in the torch, increasing the standard flow velocity of working gas swirling within the gas passage 133 has little or no effect on, or more particularly may actually decrease, the useful lifetime of the electrode where the current level and the standard volumetric flow rate are held constant. Consequently, the resultant advantages obtained by increasing the standard flow velocity of working gas swirling within the gas passage (e.g., by decreasing the cross-sectional area of the gas passage) are achieved in combination with using a textured electrode 37 capable of turbulating the gas flowing over the outer surface of the electrode.

Also, where the electrode having substantially circumferential grooves was incorporated in the torch the useful lifetime of the electrode was substantially less than that of textured electrodes 37 tested at similar standard flow velocities and the same current level and standard volumetric flow rate. Thus, for a plasma arc torch in which the working gas swirls within the gas passage 133 about the electrode 37, the longitudinally extending grooves yield a noticeably greater useful lifetime of the electrode than substantially circumferentially oriented grooves.

Comparing the data obtained for tests in which the torch was operated at a current level of 80 amps with the tests in which the torch was operated at a current level of 40 amps, it can be seen that the standard flow velocity, and accordingly the useful lifetime of the textured electrode 37, increased for the torch operated at 40 amps by decreasing the cross-sectional area of the gas passage 133 along with the current level and standard volumetric flow rate. Thus, the decrease in standard volumetric flow rate conventionally associated with the decrease in current level is overcome by decreasing the cross-sectional area of the gas passage 133 to maintain a desired standard flow velocity in the gas passage. For example, the cross-sectional area of the gas passage 133 is preferably sized for a given current level at which the torch is operated such that the standard gas flow velocity in the gas passage is at least about 140 ft/sec, more preferably at least about 160 ft/sec, and most preferably at least about 190 ft/sec.

Therefore, in accordance with a further aspect of this invention, a series of electrodes 37 may be provided wherein each electrode corresponds to a different current level and is has a textured surface 76, such as by having grooves 82 (FIG. 10*b*) extending axially therein, to promote turbulence of working gas flowing over the outer surface of the electrode as the working gas swirls within the gas passage. More particularly, the outer diameter (e.g., outer surface) of the electrode 133 is increased, or stated more broadly, the cross-sectional area of the electrode is increased, as the current level at which the torch is operated decreases. By increasing the cross-sectional area of the electrode 37, the cross-sectional area of the gas passage 133 is correspondingly decreased as the current level decreases to maintain the desired standard flow velocity in the gas passage.

In an alternative embodiment, a series of tips 131 may be provided for a torch having a textured electrode 37 capable of turbulating gas swirling within the gas passage 133 about the outer surface of the electrode. Each of the tips 131 corresponds to a current level at which the torch may be operated. More particularly, the central exit orifice 145 of the tip 131 is decreased as the current level at which the torch operates decreases. The inner diameter (e.g., inner surface) of the tip 131 is decreased, so that the cross-sectional area of the gas passage 133 is correspondingly decreased, as the current level at which the torch is operated decreases to maintain the desired standard flow velocity in the gas passage.

In another embodiment, a series of electrode 37 and tip 131 sets can be provided, with each set including an electrode having a textured outer surface 76 and one tip. Each set corresponds to a particular current level at which the torch may be operated. The central exit orifice 145 of the tip 131 is decreased as the current level at which the torch operates decreases. The electrode 37 outer diameter and tip 131 inner diameter are sized relative to each other such that the cross-sectional area of the gas passage 133 is correspondingly decreased as the current level at which the torch is operated decreases to generally maintain the desired standard flow velocity in the gas passage.

Thus, these sets are designed so that the dimensions of the gas passage 133 for each set decreases as the current level (amperage) decreases. Thus, if the standard volumetric flow rate is decreased at lower current levels, the decreased dimensions of the gas flow passage 133 will result in a higher standard flow velocity within the gas passage for good cooling even at the lower standard volumetric flow rates. The cross-sectional area of the annular gas passage 133 of each set can be varied by changing the dimensions of either or both the electrode 37 and tip 131 to correspond to the desired standard flow velocity through the gas passage for increasing the useful lifetime of the electrode.

Figure 11:
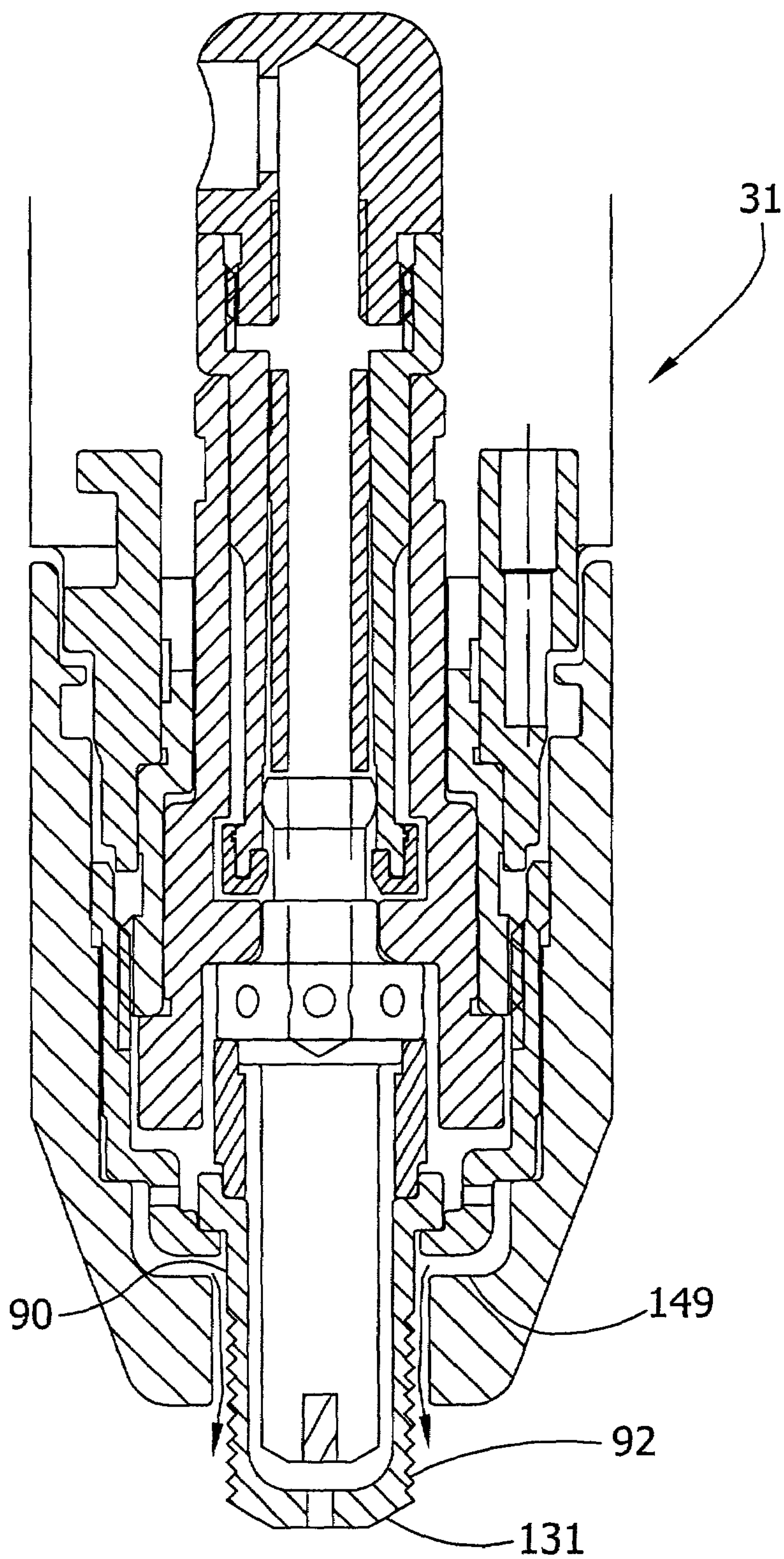
FIG. 11 is vertical section similar to FIG. 1, with an outer surface of the tip textured in accordance with the present invention.

FIG. 11 illustrates the torch head 31 of the plasma arc torch of FIG. 1 with an outer surface 90 of the torch tip 131 being roughened or otherwise textured in accordance with the present invention. In this embodiment, convective cooling of the torch tip 131 is accomplished by directing a flow of non-swirling gas through the secondary gas passage 149 over the textured outer surface 90 of the tip. It is understood, however, that the gas in the secondary gas passage may instead have a swirling motion without departing from the scope of this invention. The textured outer surface 90 of the tip 131 may be formed by generally concentric grooves 92 in the outer surface of the tip and spaced at intervals along the surface or by one or more spiral grooves (not shown), oriented either clockwise or counterclockwise, in the tip outer surface so that the grooves are in a generally crosswise orientation relative to the gas flowing through the secondary gas passage 149.

Figure 11A:
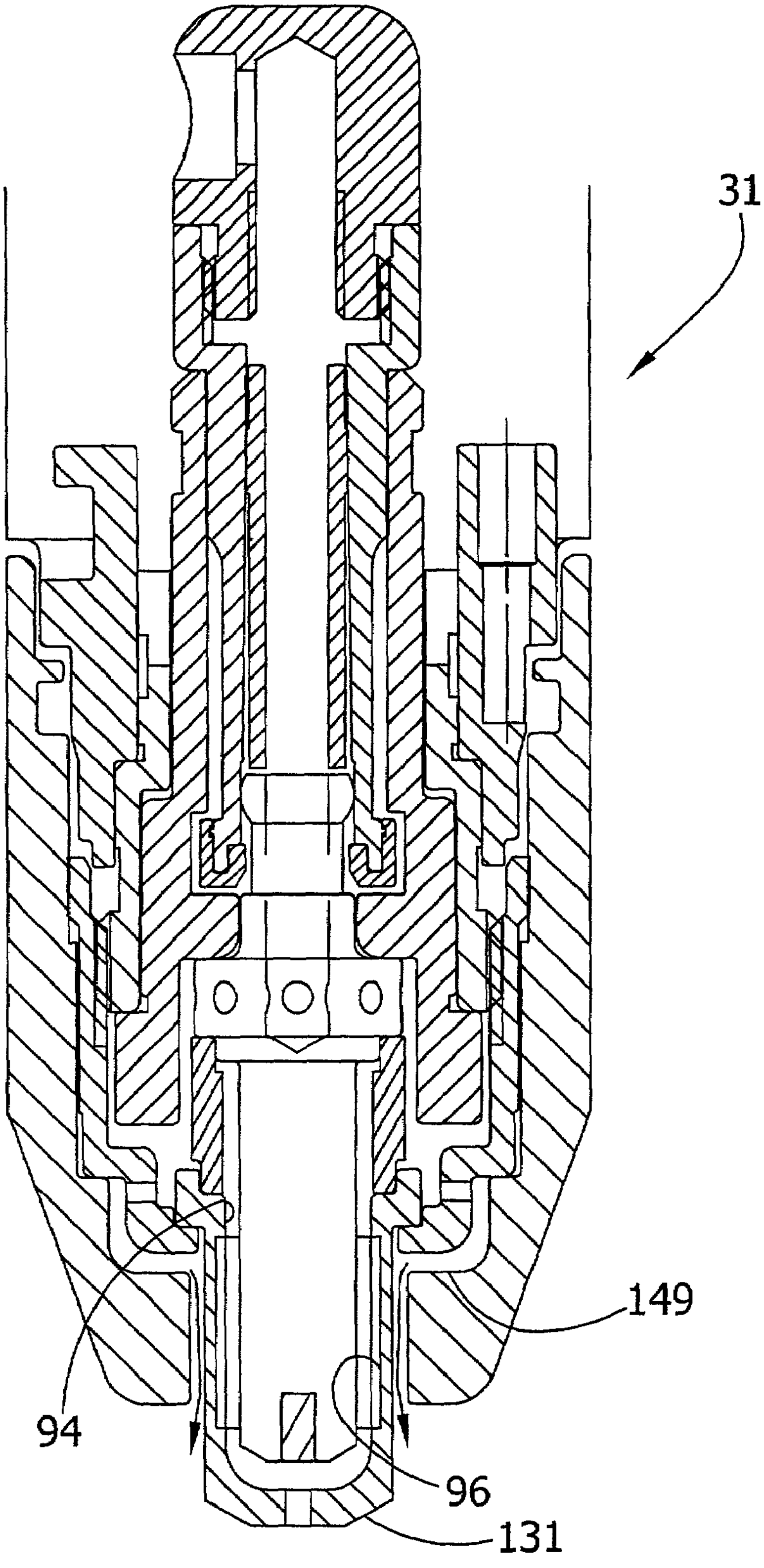
FIG. 11*a* is a vertical section similar to FIG. 11, with an inner surface of the tip textured in accordance with the present invention instead of the outer surface of the tip.

FIG. 11*a* illustrates the torch head 31 of FIG. 11 with an inner surface 94 of the torch tip 131 being roughened or otherwise textured in accordance with the present invention. In this embodiment, convective cooling of the torch tip 131 is accomplished by directing gas to flow down through the gas passage 133 in a generally swirling direction over the textured inner surface 94 of the tip. The textured inner surface 94 of the tip 131 may be formed by axially extending grooves 96 in the inner surface of the tip, or by dimples (not shown but similar to the dimples 80 of the electrode 37 of FIG. 10*a*) or one or more spiral grooves (not shown but similar to the grooves 84 in the electrode 37 of FIG. 10*c*. In this manner the axially extending grooves 96 or spiral grooves are oriented generally crosswise relative to the direction that gas swirls about the electrode within the gas passage 133 over the inner surface of the tip.

Figure 12:
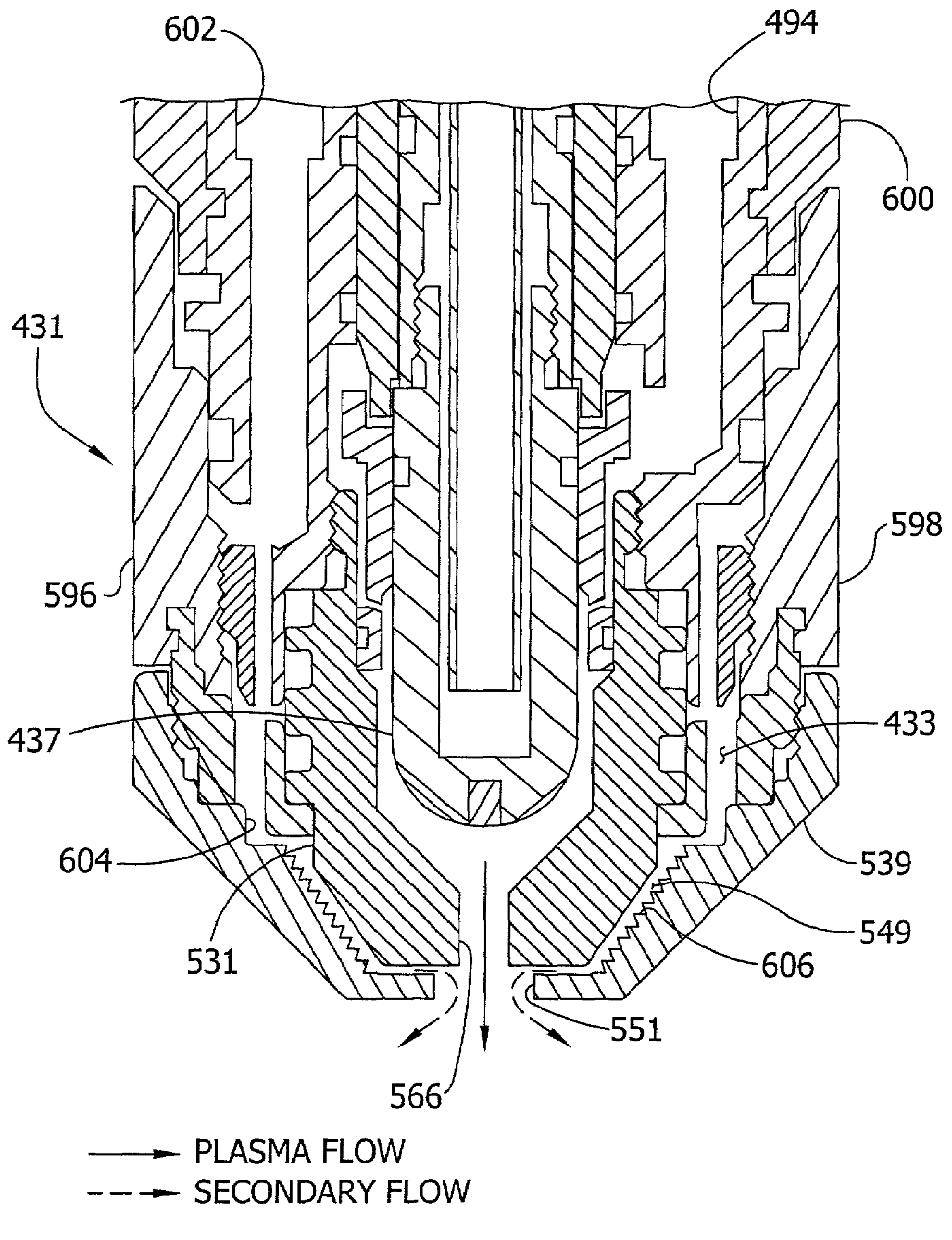
FIG. 12 is a partial section of another embodiment of a torch head of a plasma arc torch of the present invention with an inner surface of a shield cap textured in accordance with the present invention.

FIG. 12 illustrates another embodiment of a torch head 431 of a plasma arc torch of the present invention. This torch is of a dual-gas type in which a secondary working gas, separate from the primary working gas, is utilized during operation of the torch. In this torch, primary working gas enters the torch at an inlet 494 and is directed into and through the gas passage 433 formed by the electrode 437 and tip 531 before being exhausted from the torch through the central exit orifice 566 of the tip. The torch head 431 includes a shield cap assembly 596 comprising a shield cap 539 generally surrounding the torch tip 531 in spaced relationship therewith to partially define a secondary gas passage 549. The assembly 596 also includes a retainer 598 for use in securing the shield cap assembly to the torch body 600. Secondary working gas is received in the torch head 431 via a second inlet 602 and is directed through the torch to the secondary gas passage 549 for exhaust from the torch via a central exhaust opening 551 of the shield cap 539.

As shown in FIG. 12, an inner surface 604 of the shield cap 539 is roughened or otherwise textured in accordance with the present invention. Convective cooling of the shield cap 539 of the illustrated embodiment is accomplished by directing non-swirling secondary working gas through the secondary gas passage 549 in a generally axial direction over the inner surface 604 of the shield cap 539. However, it is understood that secondary gas may flow through the secondary gas passage in a generally swirling motion without departing from the scope of the invention. The textured inner surface 604 of the shield cap 539 may be formed by concentric grooves 606 in the inner surface of the cap and spaced at intervals along the inner surface or by one or more spiral grooves (not shown), oriented either clockwise or counterclockwise, such that the grooves have a generally crosswise orientation relative to the flow of secondary working gas through the secondary gas passage 549.

While the textured surfaces of the consumable parts of the torch are generally shown and described above as being formed by cutting into the surface of the consumable part, it is understood that the textured surface may be formed by raising the surface of the part, such as by forming bumps, fins or other suitable formations on the surface of the part, without departing from the scope of this invention.

The embodiments illustrated and described above can be used in combination with each other to enhance the useful life of all of the consumable parts of the plasma arc torch. For example, it is contemplated that texturing the opposing surfaces that form an annular gas passage 133 (e.g., the outer surface of the electrode 37 and the inner surface of the tip 131, or the outer surface of the tip and the inner surface of the shield cap 549) will create additional turbulence in the hydrodynamic boundary layer of the cooling gas to further improve convective cooling of each consumable part.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A plasma arc torch comprising:

a cathode;

an electrode electrically connected to the cathode and defining an outer surface; and a tip surrounding at least a portion of the electrode in spaced relationship therewith to define a gas passage between the outer surface of the electrode and the tip, the gas passage being in fluid communication with a source of working gas for receiving working gas into the gas passage such that working gas within the gas passage defines a flow having a laminar boundary layer attached to the outer surface of the electrode, the tip having a central exit orifice in fluid communication with the gas passage;

the outer surface of the electrode being textured to promote turbulence of the working gas flowing in the laminar boundary layer while not affecting a flow pattern in a bulk region above the laminar boundary layer as working gas swirls within the gas passage, wherein the working gas within the laminar boundary layer is turbulated for enhancing convective cooling of the electrode.

2. A plasma arc torch as set forth in claim 1 wherein the textured outer surface of the electrode has dimples formed therein.

3. A plasma arc torch as set forth in claim 1 wherein the textured outer surface of the electrode comprises at least one groove formed therein, the at least one groove extending in a direction generally crosswise to the direction that working gas swirls within the gas passage about the outer surface of the electrode, said at least one groove at least partially extending axially within the outer surface of the electrode and being sized to turbulate the working gas flowing over the outer surface of the electrode.

4. A plasma arc torch as set forth in claim 3 wherein the textured outer surface of the electrode has a plurality of axially extending grooves formed therein, the axially extending grooves being in generally parallel spaced relationship with each other about the outer surface of the electrode.

5. A plasma arc torch as set forth in claim 4 wherein the grooves extend axially within the outer surface of the electrode along substantially the entire length of said at least a portion of the electrode surrounded by the tip to define the gas passage therebetween.

6. A plasma arc torch as set forth in claim 3 wherein the at least one groove spirals downward within the outer surface of the electrode in a direction counter to the direction that working gas swirls about the outer surface of the electrode within the gas passage.

7. A plasma arc torch as set forth in claim 6 wherein the pitch of said at least one spiral groove is approximately equal to or less than the pitch of the working gas swirling within the gas passage.

8. A plasma arc torch as set forth in claim 1 wherein the standard gas flow velocity of working gas flowing within the gas passage is at least about 140 ft/sec.

9. A plasma arc torch as set forth in claim 8 wherein the standard gas flow velocity of working gas flowing within the gas passage is at least about 160 ft/sec.

10. A plasma arc torch as set forth in claim 9 wherein the standard gas flow velocity of the working gas flowing within the gas passage is at least about 190 ft/sec.

11. A plasma arc torch as set forth in claim 1 wherein the spacing between the textured outer surface of the electrode and an inner surface of the tip defines a cross-sectional area of the gas passage therebetween, the electrode and tip being sized relative to each other such that the cross-sectional area of the gas passage corresponds to a predetermined current level at which the torch is operated.

12. A plasma arc torch as set forth in claim 11 wherein the cross-sectional area of the gas passage is sized such that the standard gas flow velocity of working gas flowing within the gas passage is at least about 140 ft/sec. when the torch is operated at said predetermined current level.

13. A plasma arc torch as set forth in claim 12 wherein the predetermined current level at which the torch is operated is the range of about 40 amps to about 80 amps.

14. A plasma arc torch as set forth in claim 12 wherein the cross-sectional area of the gas passage is decreased as the current level at which the torch is operated is decreased.

15. A plasma arc torch comprising:

a cathode;

an electrode electrically connected to the cathode; and a tip defining an inner surface and surrounding a portion of the electrode in spaced relationship therewith to define a primary gas passage between the inner surface of the tip and the electrode, the primary gas passage being in fluid communication with a source of primary working gas for receiving primary working gas into the gas passage such that the primary working gas defines a flow having a laminar boundary layer attached to the inner surface of the tip, the tip having a central exit orifice in fluid communication with the gas passage;

the inner surface of the tip being textured to promote turbulence of the working gas flowing in the laminar boundary layer while not changing a flow pattern in a bulk region above the laminar boundary layer, wherein the working gas within the laminar boundary layer is turbulated for enhancing convective cooling of the tip.

16. A plasma arc torch as set forth in claim 15 wherein the textured inner surface of the tip has dimples formed therein.

17. A plasma arc torch as set forth in claim 15 wherein the textured inner surface of the tip has axially extending grooves formed therein.

18. A plasma arc torch as set forth in claim 15 wherein the textured inner surface of the tip has a generally spiral groove formed therein.

19. A plasma arc torch as set forth in claim 18 wherein working gas flows through the gas passage in a generally spiral flow direction about the electrode, the spiral groove in the inner surface of the tip spiraling in a direction counter to the spiral flow direction of the working gas through the gas passage.

20. A plasma arc torch comprising:

a cathode;

an electrode electrically connected to the cathode;

a tip defining an outer surface and surrounding a portion of the electrode in spaced relationship therewith to define a primary gas passage between the outer surface of the tip and the electrode, the primary gas passage being in fluid communication with a source of primary working gas for receiving primary working gas into the gas passage, the tip having a central exit orifice in fluid communication with the gas passage; and a shield cap surrounding the tip in spaced relationship with the outer surface of the tip to define a secondary gas passage for directing gas through the torch and over the outer surface of the tip, the secondary gas passage defining a flow having a laminar boundary layer attached to the outer surface of the tip, the shield cap having at least one opening therein for exhausting gas in the secondary gas passage from the torch;

the outer surface of the tip being textured to promote turbulence of the gas flowing in the laminar boundary layer while not changing a flow pattern in a bulk region above the laminar boundary layer, wherein the working gas within the laminar boundary layer is turbulated for enhancing convective cooling of the tip.

21. A plasma arc torch as set forth in claim 20 wherein the textured outer surface of the tip has dimples formed therein.

22. A plasma arc torch as set forth in claim 20 wherein the textured outer surface of the tip has at least one groove formed therein.

23. A plasma arc torch as set forth in claim 22 wherein the at least one groove formed in the outer surface of the tip has a generally crosswise orientation relative to the flow direction of the gas flowing through the secondary gas passage.

24. A plasma arc torch as set forth in claim 23 where the groove is spiraled.

25. A plasma arc torch as set forth in claim 23 wherein the gas flows substantially axially through the secondary gas passage, the at least one groove comprising a plurality of grooves formed in the textured outer surface of the tip extending generally circumferentially about the tip at intervals along the tip.

26. A plasma arc torch comprising:

a cathode;

an electrode electrically connected to the cathode;

a tip surrounding a portion of the electrode in spaced relationship therewith to define a primary gas passage, the primary gas passage being in fluid communication with a source of primary working gas for receiving primary working gas into the gas passage, the tip having a central exit orifice in fluid communication with the gas passage; and a shield cap defining an inner surface and surrounding the tip in spaced relationship therewith to define a secondary gas passage between the inner surface of the shield cap and the tip for directing gas through the torch over the inner surface of the shield cap, the secondary gas passage defining a flow having a laminar boundary layer attached to the inner surface of the shield cap, the shield cap having at least one opening therein for exhausting gas in the secondary gas passage from the torch;

the inner surface of the shield cap being textured to promote turbulence of the secondary gas flowing in the laminar boundary layer while not changing a flow pattern in a bulk region above the laminar boundary layer, wherein the secondary gas within the laminar boundary layer is turbulated for enhancing convective cooling of the shield cap.

27. A plasma arc torch as set forth in claim 26 wherein the textured inner surface of the shield cap has dimples formed therein.

28. A plasma arc torch as set forth in claim 26 wherein the textured inner surface of the shield cap has at least one groove formed therein.

29. A plasma arc torch as set forth in claim 28 wherein the at least one groove formed in the inner surface of the shield cap has a generally crosswise orientation relative to the gas flowing through the secondary gas passage.

30. A plasma arc torch as set forth in claim 29 where the at least one groove is spiraled.

31. A plasma arc torch set forth in claim 29 wherein the gas flows substantially axially through the secondary gas passage, the at least one groove comprising a plurality of grooves formed in the textured inner surface of the shield cap extending generally circumferentially about the shield cap at intervals along the shield cap.

32. An electrode for use in a plasma arc torch of the type having a cathode, a gas passage defined at least in part by an outer surface of the electrode and a tip surrounding the electrode in spaced relationship therewith and working gas flowing through the gas passage in a generally swirling direction about the outer surface of the electrode, the gas passage defining a flow having a laminar boundary layer attached to the outer surface of the electrode, the electrode comprising:

an upper end adapted for electrical connection to the cathode;

a lower end face having a recess therein;

an insert in the recess of the lower end face, the insert being constructed of an emissive material; and a longitudinal portion intermediate the upper end and the lower face of the electrode, the outer surface of the electrode along the longitudinal portion being textured to promote turbulence of the working gas flowing in the laminar boundary layer while not changing a flow pattern in a bulk region above the laminar boundary layer, wherein the working gas within the laminar boundary aver is turbulated for enhancing convective cooling of the electrode.

33. An electrode as set forth in claim 32 wherein the upper end of the electrode is configured for quick connect/disconnect connection with the cathode.

34. An electrode as set forth in claim 33 wherein the upper end of the electrode is configured for a threadless quick connect/disconnect connection with the cathode.

35. An electrode as set forth in claim 34 wherein the upper end of the electrode has a detent extending generally radially therefrom for threadless interconnection with the cathode of the plasma torch to inhibit axial movement of the electrode out of the torch.

36. An electrode as set forth in claim 32 wherein the textured outer surface of said longitudinal portion of the electrode has dimples formed therein.

37. An electrode as set forth in claim 32 wherein the textured outer surface of said longitudinal portion of the electrode comprises at least one groove formed therein, the at least one groove extending in a direction generally crosswise to the direction that working gas swirls within the gas passage about the outer surface of the electrode, said at least one groove at least partially extending axially within the outer surface of the electrode and being sized to turbulate the working gas flowing over the outer surface of the electrode.

38. An electrode as set forth in claim 37 wherein the textured outer surface of the electrode has a plurality of axially extending grooves formed therein, the axially extending grooves being in generally parallel spaced relationship with each other about the outer surface of said longitudinal portion of the electrode.

39. An electrode as set forth in claim 38 wherein said plurality of grooves extend axially within the outer surface of the electrode along substantially the entire length of said longitudinal portion of the electrode.

40. An electrode as set forth in claim 37 wherein the at least one groove spirals within the outer surface of the electrode toward the lower end face of the electrode in a direction counter to the direction that working gas swirls about the outer surface of the electrode within the gas passage.

41. An electrode as set forth in claim 40 wherein the pitch of said at least one spiral groove is approximately equal to or less than the pitch of the working gas swirling downward with the gas passage.

42. An electrode as set forth in claim 37 wherein the working gas swirling within the gas passage defines a hydrodynamic boundary layer adjacent the outer surface of the electrode, the boundary layer including a turbulent outer layer, the at least one groove in the electrode being sized to turbulate working gas in the hydrodynamic boundary layer generally adjacent the outer surface of the electrode to increase turbulent flow in the boundary layer for enhancing convective cooling of the electrode.

43. An electrode as set forth in claim 32 wherein the cross-sectional area of said longitudinal portion of the electrode corresponds to a predetermined current level at which the torch is operable.

44. A torch tip for use in a plasma arc torch of the type having a cathode, a primary gas passage defined by an electrode electrically connected to the cathode and an inner surface of the tip surrounding the electrode in spaced relationship therewith and working gas flowing through the primary gas passage, the gas passage defining a flow having a laminar boundary layer attached to the inner surface of the tip, the torch tip comprising:

a lower end having a central exit orifice in fluid communication with the primary gas passage for exhausting working gas from the primary gas passage, the inner surface of the tip being textured to promote turbulence of the gas flowing in the laminar boundary layer while not changing a flow pattern in a bulk region above the laminar boundary layer, wherein the working gas within the laminar boundary layer is turbulated for enhancing convective cooling of the tip.

45. A torch tip as set forth in claim 44 wherein the textured inner surface of the tip has dimples formed therein.

46. A torch tip as set forth in claim 44 wherein the textured inner surface of the tip has axially extending grooves formed therein.

47. A torch tip as set forth in claim 44 wherein the textured inner surface of the tip has a generally spiral groove formed therein.

48. A torch tip as set forth in claim 47 wherein the spiral groove formed in the inner surface of the tip is oriented in a direction generally crosswise to the direction that gas flows within the primary gas passage.

49. A torch tip for use in a plasma arc torch of the type having a cathode, a primary gas passage defined at least in part by an electrode electrically connected to the cathode and the tip surrounding the electrode in spaced relationship therewith and working gas flowing through the primary gas passage, and a shield cap surrounding at least a portion of an outer surface of the tip in spaced relationship therewith to define a secondary gas passage through which working gas flows, the secondary gas passage defining a flow having a laminar boundary layer attached to the outer surface of the tip, the torch tip comprising:

a lower end having a central exit orifice in fluid communication with the primary gas passage for exhausting working gas from the primary gas passage, the outer surface of the tip being textured to promote turbulence of the gas flowing in the laminar boundary layer while not changing a flow pattern in a bulk region above the laminar boundary layer, wherein the secondary gas within the laminar boundary layer is turbulated for enhancing convective cooling of the tip.

50. A torch tip as set forth in claim 49 wherein the textured outer surface of the tip has dimples formed therein.

51. A torch tip as set forth in claim 49 wherein the textured outer surface of the tip has axially extending grooves formed therein.

52. A torch tip as set forth in claim 49 wherein the textured outer surface of the tip has a generally groove formed therein.

53. A torch tip as set forth in claim 52 wherein the spiral groove formed in the outer surface of the tip is oriented in a direction generally crosswise to the direction that gas flows within the secondary gas passage.

54. A shield cap for use in a plasma arc torch of the type having a cathode, a primary gas passage defined at least in part by an electrode electrically connected to the cathode and a tip surrounding the electrode in spaced relationship therewith and working gas flowing through the primary gas passage, the shield cap surrounding at least a portion of the tip in spaced relationship therewith to define a secondary gas passage between an inner surface of the shield cap and the tip through which working gas flows, the secondary gas passage having a laminar boundary layer attached to the inner surface of the shield cap, the shield cap comprising:

a lower end having at least one exhaust orifice in fluid communication with the secondary gas passage for exhausting working gas from the secondary gas passage, the inner surface of the shield cap being textured to promote turbulence of the gas flowing in the laminar boundary layer while not changing a flow pattern in a bulk region above the laminar boundary layer, wherein the secondary gas within the laminar boundary layer is turbulated for enhancing convective cooling of the shield cap.

55. A shield cap as set forth in claim 54 wherein the textured inner surface of the shield cap has dimples formed herein.

56. A shield cap as set forth in claim 54 wherein the textured inner surface of the shield cap has axially extending grooves formed therein.

57. A shield cap as set forth in claim 54 wherein the textured inner surface of the shield cap has a generally spiral groove formed therein.

58. A shield cap as set forth in claim 57 wherein the spiral groove formed in the inner surface of the shield cap is oriented in a direction generally crosswise to the direction that gas flows within the secondary gas passage.

59. A set of electrodes for use in a plasma arc torch of the type having a cathode, an electrode electrically connected to the cathode, a tip surrounding at least a portion of the electrode in spaced relationship therewith to define a gas passage between an outer surface of the electrode and the tip, the gas passage being in fluid communication with a source of working gas for receiving working gas into the gas passage such that the working gas flows within the gas passage in a generally swirling direction about the outer surface of the electrode in the gas passage, the tip having a central exit orifice in fluid communication with the gas passage, said set of electrodes comprising:

at least two interchangeable electrodes, each electrode corresponding to a different current level at which the torch is operable, the outer surface of each electrode being textured to promote turbulence of the working gas flowing over the outer surface of the electrode as the working gas swirls about the electrode, the cross-sectional area of the textured outer surface of each electrode increasing as the current level at which the torch can be operated decreases to thereby decrease the cross-sectional area of the gas passage as the current level decreases.

60. A set of electrodes as set forth in claim 59 wherein the torch is further of type wherein the standard volumetric flow rate of gas through the torch is decreased as the current level at which the torch is operated decreases, the cross-sectional area of the textured outer surface of each electrode being sized to maintain a standard gas flow velocity in the gas passage of at least about 140 ft/sec as the current level at which the torch is operated decreases.

61. A set of tips for use in a plasma arc torch of the type having a cathode, an electrode electrically connected to the cathode, a tip surrounding at least a portion of the electrode in spaced relationship therewith to define a gas passage between an inner surface of the tip and an outer surface of the electrode, the gas passage being in fluid communication with a source of working gas for receiving working gas into the gas passage such that the working gas flows within the gas passage in a generally swirling direction about the outer surface of the electrode, the electrode outer surface being textured to promote turbulence of the working gas flowing over the outer surface of the electrode as working gas swirls about the electrode, the tip having a central exit orifice in fluid communication with the gas passage, said torch being operable at difference current levels, said set of tips comprising:

at least two interchangeable tips, each tip corresponding to a different current level at which the torch is operable, the central exit orifice of the tips substantially decreasing as the current level at which the torch can be operated decreases, each tip having the inner surface defining an inner cross-sectional area of the tip, the inner cross-sectional area of the tips substantially increasing as the current level at which the torch can be operated decreases.

62. A set of tips as set forth in claim 61 wherein the torch is further of type wherein the standard volumetric flow rate of gas through the torch is decreased as the current level at which the torch is operated decreases, the inner cross-sectional area of each tip being sized to maintain a standard gas flow velocity in the gas passage of at least about 140 ft/sec as the current level at which the torch is operated decreases.

63. A series of electrode and tip sets for use in a plasma arc torch of the type having a cathode, an electrode electrically connected to the cathode, a tip surrounding at least a portion of the electrode in spaced relationship therewith to define a gas passage, the gas passage being in fluid communication with a source of working gas for receiving working gas into the gas passage such that the working gas flows over an outer surface of the electrode in the gas passage in a generally swirling direction about the electrode, the tip having a central exit orifice in fluid communication with the gas passage, said torch being operable at different current levels, said series of electrode and tip set comprising:

a plurality of electrode and tip sets, each set corresponding to a different current level at which the torch is operable, each set comprising an electrode having a textured outer surface to promote turbulence of the working gas flowing over the outer surface of the electrode as the working gas swirls about the electrode, and a tip, whereby the size of the central exit orifice of the tip decreases for each set as the current level at which the torch is operable decreases, the electrode and tip of each set being sized relative to each other such that the cross-sectional area of the gas passage defined therebetween decreases for each set as the current level at which the torch is operable decreases.

64. A series of electrode and tip sets as set forth in claim 63 wherein the torch is further of type wherein the standard volumetric flow rate of gas through the torch is decreased as the current level at which the torch is operated decreases, the electrode and tip of each set being sized relative to each other to maintain a standard gas flow velocity in the gas passage of at least about 140 ft/sec as the current level at which the torch is operated decreases.

65. A method of improving the useful life of an electrode used in a plasma arc torch, the plasma arc torch comprising a cathode, an electrode electrically connected to the cathode and a tip surrounding a portion of the electrode in spaced relationship therewith to define a gas passage between the tip and an outer surface of the electrode, the tip having a central exit orifice in fluid communication with the gas passage, the method comprising:

directing working gas through the gas passage for exhaust from the torch through the central exit orifice of the tip, the working gas swirling within the gas passage about the electrode to flow over the outer surface of the electrode as it is directed through the gas passage to define a flow having a laminar boundary layer attached to the outer surface of the electrode, and turbulating the gas in the laminar boundary layer while not changing a flow pattern in a bulk region above the laminar boundary layer as gas is directed through the gas passage to increase turbulent flow in the boundary layer for enhancing convective cooling of the electrode thereby to improve the useful life of the electrode.

66. A method as set forth in claim 60 wherein the step of directing working gas through the gas passage comprises directing working gas through the gas passage at a standard flow velocity of at least about 140 ft/sec.

67. A method as set forth in claim 66 wherein the step of directing working gas through the gas passage comprises directing working gas through the gas passage at a standard flow velocity of at least about 160 ft/sec.

68. A method as set forth in claim 67 wherein the step of directing working gas through the gas passage comprises directing working gas through the gas passage at a standard flow velocity of at least about 190 ft/sec.

69. A method as set forth in claim 65 further comprising the step of decreasing the cross-sectional area of the gas passage as the current level at which the torch is operated is decreased.

70. A method as set forth in claim 65 wherein the step of turbulating the gas in the hydrodynamic boundary layer generally adjacent the outer surface of the electrode comprises directing the working gas swirling within the gas passage to flow over a textured outer surface of the electrode to promote turbulence of working gas generally adjacent the outer surface of the electrode as working gas swirls within the gas passage about the electrode.

71. A method of improving the useful life of a torch tip used in a plasma arc torch, the plasma arc torch comprising a cathode, an electrode electrically connected to the cathode, a torch tip surrounding a portion of the electrode in spaced relationship therewith to define a primary gas passage, the torch tip having a central exit orifice in fluid communication with the gas passage, and a shield cap surrounding the tip in spaced relationship therewith to define a secondary gas passage between the shield cap and an outer surface of the tip for directing working gas through the torch, the shield cap having at least one opening therein for exhausting gas in the secondary gas passage from the torch, the method comprising:

directing working gas through the secondary gas passage for exhaust from the torch through the at least one opening of the shield cap, the working gas flowing over the outer surface of the torch tip as it is directed through the secondary gas passage to define a flow having a laminar boundary layer attached to the outer surface of the tip, and turbulating the gas in the laminar boundary aver while not changing a flow pattern in a bulk region above the laminar boundary layer as gas is directed through the secondary gas passage to increase turbulent flow in the boundary layer for enhancing convective cooling of the torch tip thereby to improve the useful life of the torch tip.

72. A method of improving the useful life of a shield cap used in a plasma arc torch, the plasma arc torch comprising a cathode, an electrode electrically connected to the cathode, a torch tip surrounding a portion of the electrode in spaced relationship therewith to define a primary gas passage, the torch tip having a central exit orifice in fluid communication with the gas passage, and a shield cap surrounding the tip in spaced relationship therewith to define a secondary gas passage between the tip and an inner surface of the shield cap for directing working gas through the torch, the shield cap having at least one opening therein for exhausting gas in the secondary gas passage from the torch, the method comprising:

directing working gas through the secondary gas passage for exhaust from the torch through the at least one opening of the shield cap, the working gas flowing over the inner surface of the shield cap as it is directed through the secondary gas passage to define a flow having a laminar boundary layer attached to the inner surface of the shield cap, and turbulating the gas in the laminar boundary layer while not changing a flow pattern in a bulk region above the laminar boundary layer as gas is directed through the secondary gas passage to increase turbulent flow in the boundary layer for enhancing convective cooling of the shield cap thereby to improve the useful of the shield cap.

73. A method of improving the useful life of an electrode or tip of a plasma arc torch, the torch comprising a cathode, an electrode electrically connected to the cathode, and a tip surrounding a portion of the electrode in spaced relationship therewith to define an annular gas passage between an inner surface of the tip and an outer surface of the electrode, the gas passage defining a flow having a laminar boundary layer attached to the outer surface of the electrode and a laminar boundary layer attached to the inner surface of the tip, the tip having a central exit orifice in fluid communication with the gas passage, the method comprising:

texturing the surface of at least one of the electrode and tip to promote turbulence of the flow in the laminar boundary layer while not changing a flow pattern in a region above the laminar boundary layer;

changing the level of electrical current supplied to the electrode, and modifying one or more of the following parameters in response to the change in current: (1) the standard volumetric gas flow rate through said annular gas passage, and (2) the dimensions of the annular gas passage.

74. A method as set forth in claim 73 wherein the dimensions of the annular gas passage are changed by at least one of the following: (1) increasing an outside dimension of the electrode and (2) decreasing an inside dimension of the tip.

* * * * *

UNITED STATES PATENT AND TRADEMARK OFFICE

CERTIFICATE OF CORRECTION

PATENT NO. : 6,987,238 B2 
DATED : January 17, 2006
INVENTOR(S) : Kevin D. Horner-Richardson et al.

It is certified that error appears in the above-identified patent and that said Letters Patent is hereby corrected as shown below:

<u>Column 24,</u>
Line 25, delete "aver" and insert -- layer --.

Signed and Sealed this

Eighteenth Day of April, 2006

JON W. DUDAS
*Director of the United States Patent and Trademark Office*